United States Patent
Burtea et al.

(10) Patent No.: US 12,196,714 B2
(45) Date of Patent: Jan. 14, 2025

(54) ACOUSTIC PIPELINE CONDITION ASSESSMENT AT RESOLUTION DOWN TO PIPE STICK

(71) Applicant: Mueller International, LLC, Atlanta, GA (US)

(72) Inventors: Valentin Mircea Burtea, Toronto (CA); Joseph Butterfield, Gateshead (GB); Bruce Robertson, Toronto (CA); Sebastien Perrier, Toronto (CA)

(73) Assignee: Mueller International, LLC

(*) Notice: Subject to any disclaimer, the term of this patent is extended or adjusted under 35 U.S.C. 154(b) by 450 days.

(21) Appl. No.: 17/378,905

(22) Filed: Jul. 19, 2021

(65) Prior Publication Data

US 2023/0017820 A1    Jan. 19, 2023

(51) Int. Cl.
*G01N 29/07*    (2006.01)
*G01M 3/24*    (2006.01)
(Continued)

(52) U.S. Cl.
CPC ............ *G01N 29/07* (2013.01); *G01M 3/243* (2013.01); *G01N 29/42* (2013.01); *G01N 29/50* (2013.01)

(58) Field of Classification Search
CPC ........ G01N 29/07; G01N 29/42; G01N 29/50; G01M 3/243
(Continued)

(56) References Cited

U.S. PATENT DOCUMENTS 3,011,754 A    12/1961    Ander
3,216,244 A    11/1965    Borchers
(Continued)

FOREIGN PATENT DOCUMENTS

CA    2989333    4/2024
CN    1307675    8/2001
(Continued)

OTHER PUBLICATIONS

Yusuf, Shabbir; Office Action for Chinese patent application No. 201680043097.1, filed Jun. 10, 2016, mailed Feb. 20, 2023, 16 pgs.
Burtea, Valentin Mircea; Notice of Allowance for U.S. Appl. No. 16/935,945, filed Jul. 22, 2020, mailed Apr. 19, 2023, 12 pgs.
Yusuf, Shabbir, Office Action for Canadian patent application No. 2,989,333, filed Jun. 10, 2016, mailed Feb. 21, 2023, 4 pgs.
(Continued)

*Primary Examiner* — John E Breene
*Assistant Examiner* — Rose M Miller
(74) *Attorney, Agent, or Firm* — Taylor English Duma LLP

(57) ABSTRACT

Methods, systems, and computer-readable storage media for providing high-resolution assessment of the condition of pipes of a fluid distribution down to the individual pipe stick. An acoustic sensor is placed in acoustical communication with a pipe at one end of a target segment. An acoustical wave is generated in the pipe at a first out-of-bracket excitation location while signal data is recorded from the acoustic sensor. Timing information regarding the arrival at the acoustic sensor of reflections of the acoustic wave from pipe joints in the target segment is extracted from the recorded signal data, and a time delay between reflections from consecutive pipe joints is computed. An acoustic propagation velocity in a pipe stick between the consecutive pipe joints is then computed based on the time delay and a length of the pipe stick. A condition of the pipe stick is determined based on the computed acoustic propagation velocity.

20 Claims, 10 Drawing Sheets

(51) Int. Cl.
    *G01N 29/42*     (2006.01)
    *G01N 29/50*     (2006.01)

(58) Field of Classification Search
    USPC .......................................................... 73/592
    See application file for complete search history.

(56) References Cited

U.S. PATENT DOCUMENTS

| | | |
|---|---|---|
| 3,283,833 A | 11/1966 | Bodine, Jr. |
| 4,194,246 A | 3/1980 | Crist |
| 4,289,019 A | 9/1981 | Claytor |
| 4,929,898 A | 5/1990 | Spies |
| 5,031,446 A | 7/1991 | Saito et al. |
| 5,037,327 A | 8/1991 | Van Woensel |
| 5,416,724 A | 5/1995 | Savic |
| 5,526,689 A | 6/1996 | Coulter et al. |
| 5,531,099 A | 7/1996 | Russo |
| 5,581,037 A | 12/1996 | Kwun et al. |
| 5,836,787 A | 11/1998 | Kodama |
| 6,289,723 B1 | 9/2001 | Leon |
| 6,435,030 B1 | 8/2002 | Gysling et al. |
| 6,453,247 B1 | 9/2002 | Hunaidi |
| 6,556,924 B1 | 4/2003 | Kariyawasam et al. |
| 6,561,032 B1 | 5/2003 | Hunaidi |
| 7,007,545 B1 | 3/2006 | Martinek |
| 7,059,176 B2 | 6/2006 | Sparks |
| 7,095,676 B2 | 8/2006 | D'Angelo et al. |
| 7,203,322 B1 | 4/2007 | Bostock |
| 7,266,992 B2 | 9/2007 | Shamout et al. |
| 7,283,913 B2 | 10/2007 | Garnaes |
| 7,328,618 B2 | 2/2008 | Hunaidi et al. |
| 7,475,596 B2 | 1/2009 | Hunaidi et al. |
| 7,624,650 B2 | 12/2009 | Gysling et al. |
| 7,752,918 B2 | 7/2010 | Davis |
| 7,810,378 B2 | 10/2010 | Hunaidi et al. |
| 7,830,273 B2 | 11/2010 | Twitchell, Jr. |
| 7,940,189 B2 | 5/2011 | Brown |
| 7,962,293 B2 | 6/2011 | Gysling |
| 8,296,083 B2 | 10/2012 | Martin |
| 8,601,875 B2 | 12/2013 | Paulson |
| 8,695,418 B2 | 4/2014 | Sparks et al. |
| 8,816,866 B2 | 8/2014 | Day |
| 8,966,979 B2 | 3/2015 | Amundsen |
| 9,053,519 B2 | 6/2015 | Scolnicov et al. |
| 9,134,277 B2 * | 9/2015 | Amir ...................... G01M 3/24 |
| 9,291,520 B2 | 3/2016 | Fleury, Jr. et al. |
| 9,541,432 B2 | 1/2017 | Kertesz |
| 9,651,445 B2 | 5/2017 | McIntyre |
| 9,670,650 B2 | 6/2017 | Pinney et al. |
| 9,799,204 B2 | 10/2017 | Hyland et al. |
| 9,816,848 B2 | 11/2017 | Raykhman et al. |
| 9,835,592 B2 | 12/2017 | Yusuf et al. |
| 10,067,092 B2 | 9/2018 | Burtea et al. |
| 10,209,225 B2 | 2/2019 | Perrier |
| 10,267,774 B2 | 4/2019 | Yusuf et al. |
| 10,509,012 B2 | 12/2019 | Perrier |
| 10,565,752 B2 | 2/2020 | Perrier et al. |
| 10,690,630 B2 | 6/2020 | Perrier et al. |
| 10,768,146 B1 | 9/2020 | Burtea et al. |
| 10,845,340 B2 | 11/2020 | Burtea et al. |
| 11,609,348 B2 | 3/2023 | Robertson et al. |
| 11,726,064 B2 | 8/2023 | Burtea et al. |
| 2001/0032064 A1 | 10/2001 | Araki et al. |
| 2003/0033870 A1 | 2/2003 | Shah et al. |
| 2003/0033879 A1 | 2/2003 | Adewumi |
| 2003/0185100 A1 | 10/2003 | D'Angelo et al. |
| 2004/0169108 A1 | 9/2004 | Terpay |
| 2005/0000289 A1 | 1/2005 | Gysling et al. |
| 2005/0210960 A1 | 9/2005 | Shamout et al. |
| 2006/0283251 A1 | 12/2006 | Hunaidi |
| 2007/0041333 A1 | 2/2007 | Twitchell |
| 2008/0078247 A1 | 4/2008 | Hunaidi et al. |
| 2008/0314122 A1 | 12/2008 | Hunaidi |
| 2009/0250125 A1 | 10/2009 | Howitt |
| 2010/0175477 A1 | 7/2010 | Kasai et al. |
| 2011/0161037 A1 | 6/2011 | Sutherland |
| 2012/0041694 A1 | 2/2012 | Stephens et al. |
| 2012/0055262 A1 | 3/2012 | Sinha |
| 2012/0125111 A1 | 5/2012 | Groos et al. |
| 2012/0167688 A1 | 7/2012 | Minachi et al. |
| 2013/0025375 A1 | 1/2013 | Goldner et al. |
| 2013/0036796 A1 | 2/2013 | Fleury et al. |
| 2013/0058819 A1 | 3/2013 | Kodama et al. |
| 2013/0211797 A1 | 8/2013 | Scolnicov |
| 2013/0213482 A1 | 8/2013 | Schuberth |
| 2013/0240093 A1 | 9/2013 | Okada |
| 2015/0247777 A1 | 9/2015 | Kondou |
| 2015/0300907 A1 | 10/2015 | Giunta et al. |
| 2016/0041286 A1 | 2/2016 | Sinha et al. |
| 2016/0208952 A1 | 7/2016 | Howitt |
| 2016/0223120 A1 | 8/2016 | Gagliardo |
| 2016/0252422 A1 | 9/2016 | Howitt |
| 2016/0290974 A1 | 10/2016 | Coleman |
| 2016/0370325 A1 | 12/2016 | Yusuf |
| 2017/0176395 A1 | 6/2017 | Burtea |
| 2017/0191966 A1 | 7/2017 | Niri et al. |
| 2017/0248555 A1 | 8/2017 | Yusuf et al. |
| 2017/0254782 A1 | 9/2017 | Sjoblom et al. |
| 2018/0306753 A1 | 10/2018 | Perrier |
| 2018/0306755 A1 | 10/2018 | Perrier et al. |
| 2018/0308265 A1 | 10/2018 | Perrier et al. |
| 2018/0340912 A1 | 11/2018 | Burtea et al. |
| 2019/0128766 A1 | 5/2019 | Burtea et al. |
| 2019/0128767 A1 | 5/2019 | Burtea |
| 2019/0128848 A1 | 5/2019 | Perrier |
| 2019/0390990 A1 | 12/2019 | Krywyj et al. |
| 2020/0240821 A1 | 7/2020 | Ebert |
| 2022/0026395 A1 | 1/2022 | Burtea et al. |
| 2022/0205357 A1 | 6/2022 | Robertson et al. |
| 2024/0280542 A1 | 8/2024 | Butterfield et al. |

FOREIGN PATENT DOCUMENTS

| | | |
|---|---|---|
| CN | 202867884 | 4/2013 |
| CN | 2003404430 | 1/2014 |
| CN | 106289121 | 1/2017 |
| EP | 3392636 | 10/2018 |
| EP | 3311153 | 7/2023 |
| EP | 3392636 B1 | 3/2024 |
| FR | 2754898 | 4/1998 |
| JP | 2002236115 | 8/2002 |
| KR | 20180079128 | 7/2018 |
| WO | 03/048713 | 6/2003 |
| WO | 2010020817 | 2/2010 |
| WO | 2014050618 | 4/2014 |
| WO | 2015031180 | 3/2015 |
| WO | 2015073313 | 5/2015 |
| WO | 2016160267 | 10/2016 |
| WO | 2016205082 | 12/2016 |
| WO | 2023003778 | 1/2023 |
| WO | 2024177834 | 8/2024 |

OTHER PUBLICATIONS

Gao, et al.; Article entitled: On the selection of acoustic/vibration sensors for leak detection in plastic water pipes, Science Direct, Journal of Sound and Vibration 283 (2005) 927-941, 15 pgs.

Mosland, et al.; Article entitled: Pressure Wave Velocity in Fluid-Filled Pipes with and without Deposits in the Low-Frequency Range, Journal of Hydraulic Engineering—Oct. 2018, 37 pgs.

Perrier, et al.; Article entitled: Characterization of Soil Attenuation for Acoustic Condition Assessment of Water-Filled Metal Pipes, 26th International Congress on Sound and Vibration, Jul. 7-11, 2019, Montreal, 8 pgs.

Tijsseling, A.S.; Article entitled: Water hammer with fluid-structure interaction in thick-walled pipes, Science Direct, Computers and Structures 85 (2007) 844-851, 8 pgs.

(56) References Cited

OTHER PUBLICATIONS

Tijsseling, et al.; Article entitled: "A. Isebree Moens and D.J. Korteweg: on the speed of propagation of waves in elastic tubes", Conference: BHR Group, Proc. of the 11th Int. Conf. on Pressure Surges (Editor Sandy Anderson), pp. 227-245, ISBN 978-1-85598-133-1, at Lisbon, Portugal, 19 pgs.
Almeida, et al.; Article entitled: "On the Acoustic Filtering of the Pipe and Sensor in a Buried Plastic Water Pipe and its Effect on Leak Detection: An Experimental Investigation", Sensors, published on Mar. 20, 2014, 16 pgs.
Burtea, Valentin Mircea; Non-Final Office Action for U.S. Appl. No. 16/935,945, filed Jul. 22, 2020, mailed Nov. 14, 2022, 55 pgs.
Robertson, Bruce; Notice of Allowance for U.S. Appl. No. 17/136,354, filed Dec. 29, 2020, mailed Dec. 16, 2022, 56 pgs.
Burtea, Valentin Mircea; International Search Report and Written Opinion for PCT Application No. PCT/US22/37322, filed Jul. 15, 2022, mailed Nov. 22, 2022, 14 pgs.
Coleman, Matthew Simon; Final Office Action for U.S. Appl. No. 14/674,851, filed Mar. 31, 2015, mailed Dec. 15, 2017, 38 pgs.
Coleman, Matthew Simon; Final Office Action for U.S. Appl. No. 14/674,851, filed Mar. 31, 2015, mailed May 21, 2018, 36 pgs.
Coleman, Matthew Simon; Non-Final Office Action for U.S. Appl. No. 14/674,851, filed Mar. 31, 2015, mailed Jun. 16, 2017, 50 pgs.
Hay, Lindsay; "The Influence of Soil Properties on the Performance of Underground Pipelines", Department of Soil Science, The Faculty of Agriculture, The University of Sydney, Aug. 1984, 243 pgs.
Makar, et al.; "Failure Modes and Mechanisms in Gray Cast Iron Pipe", National Research Council Canada, Copyright 2000, 11 pgs.
Muster, et al.; "Life Expectancy of Cement Mortar Linings in Cast and Ductile Iron Pipes", Water Research Foundation, Copyright 2011, 192 pgs.
Rajani, et al.; "Impact of Soil Properties on pipe corrosion: re-examination of traditional conventions", National Research Council Canada, Sep. 2010, 17 pgs.
Rajani, et al.; "Investigation of Grey Cast Iron Water Mains to Develop a Methodology for Estimating Service Life", AWWA Research Foundation, Copyright 2000, 294 pgs.
Yusuf, Shabbir; Issue Notification for U.S. Appl. No. 14/740,902, filed Jun. 16, 2015, mailed Nov. 15, 2017, 1 pg.
Yusuf, Shabbir, Non-Final Office Action for U.S. Appl. No. 14/740,902, filed Jun. 16, 2015, mailed Jan. 27, 2017, 22 pgs.
Yusuf, Shabbir; Notice of Allowance for U.S. Appl. No. 14/740,902, filed Jun. 16, 2015, mailed Aug. 30, 2017, 5 pgs.
Yusuf, Shabbir; Supplemental Notice of Allowability for U.S. Appl. No. 14/740,902, filed Jun. 16, 2015, mailed Sep. 15, 2017, 4 pgs.
Burtea, Valentin Mircea; Issue Notification for U.S. Appl. No. 14/974,351, filed Dec. 18, 2015, mailed Aug. 21, 2018, 1 pg.
Burtea, Valentin Mircea; Non-Final Office Action for U.S. Appl. No. 14/974,351, filed Dec. 18, 2015, mailed Nov. 3, 2017, 33 pgs.
Burtea, Valentin Mircea; Notice of Allowance for U.S. Appl. No. 14/974,351, filed Dec. 18, 2015, mailed Jun. 10, 2018, 10 pgs.
Burtea, Valentin Mircea; Supplemental Notice of Allowance for U.S. Appl. No. 14/974,351, filed Dec. 18, 2015, mailed May 24, 2018, 6 pgs.
Burtea, Valentin Mircea; Supplemental Notice of Allowance for U.S. Appl. No. 14/974,351, filed Dec. 18, 2015, mailed Aug. 10, 2018, 6 pgs.
Burtea, Valentin Mircea; Non-Final Office Action for U.S. Appl. No. 16/054,078, filed Aug. 3, 2018, mailed Jun. 1, 2020, 47 pgs.
Burtea, Valentin Mircea; Notice of Allowance for U.S. Appl. No. 16/054,078, filed Aug. 3, 2018, mailed Aug. 20, 2020, 5 pgs.
Burtea, Valentin Mircea; Supplemental Notice of Allowance for U.S. Appl. No. 16/054,078, filed Aug. 3, 2018, mailed Oct. 23, 2020, 6 pgs.
Burtea, Valentin Mircea; Supplemental Notice of Allowance for U.S. Appl. No. 16/054,078, filed Aug. 3, 2018, mailed Oct. 6, 2020, 6 pgs.
Yusuf, Shabbir; Issue Notification for U.S. Appl. No. 15/056,403, filed Feb. 29, 2016, mailed Apr. 3, 2019, 1 pg.
Yusuf, Shabbir; Non-Final Office Action for U.S. Appl. No. 15/056,403, filed Feb. 29, 2016, mailed Jan. 30, 2018, 29 pgs.
Yusuf, Shabbir; Non-Final Office Action for U.S. Appl. No. 15/056,403, filed Feb. 29, 2016, mailed Aug. 9, 2018, 17 pgs.
Yusuf, Shabbir; Notice of Allowance for U.S. Appl. No. 15/056,403, filed Feb. 29, 2016, mailed Jan. 2, 2019, 13 pgs.
Yusuf, Shabbir; Supplemental Notice of Allowance for U.S. Appl. No. 15/056,403, filed Feb. 29, 2016, mailed Feb. 14, 2019, 6 pgs.
Coleman, Matthew Simon; International Preliminary Report on Patentability for PCT Application No. PCT/US2016/020889, filed Mar. 4, 2016, mailed Oct. 12, 2017, 13 pgs.
Coleman, Matthew, Simon; International Search Report and Written Opinion for PCT Application No. PCT/US2016/020889, filed Mar. 4, 2016, mailed Jun. 6, 2016, 14 pgs.
De Silva et al., Condition Assessment and Probabilistic Analysis to Estimate Failure Rates in Buried Pipelines, Thermo Scientific, In: Proceedings of ASTT 5th Conference. Aug. 2002 (Aug. 2002). Retrieved from <https://www.researchgate.net/profile/Magnus_Moglia/publication/236834972_Condition_Assessment_and_Probabilistic_Analaysis_to_Estimate_Failure_Rates_in_Buried_Pipelines/links/00b7d51945e4007c48000000/pdf>, 21 pgs.
Sheppard et al., Cast Iron Fitness for Purpose (FFP)—Final Report, Macaw Engineering, Ltd., Jun. 3, 2015, Retrieved from <http://www.smartemetworks.org/Files/Cast_ Iron_Fitness_For_Purpose_ (CIFFP)_151214123856.pdf>, 91 pgs.
Yusuf, Shabbir; International Preliminary Report on Patentability for serial No. PCT/US2016/036856, filed Jun. 10, 2016, mailed Dec. 28, 2017, 9 pgs.
Yusuf, Shabbir; International Search Report and Written Opinion for serial No. PCT/US2016/036856, filed Jun. 10, 2016, mailed Sep. 9, 2016, 10 pgs.
Yusuf, Shabbir; Examination Report for Australian patent application No. 2016280629, filed Jun. 10, 2016, mailed Dec. 1, 2020, 4 pgs.
Yusuf, Shabbir; Examination Report for Australian patent application No. 2016280629, filed Jun. 10, 2016, mailed Sep. 17, 2020, 4 pgs.
Baik, et al.; Article entitled: "Acoustic Attenuation, phase and group velocities in liquid-filled pipes: Theory, experiment, and examples of water and mercury", The Journal of the Acoustical Society of America, Nov. 2010, 16 pgs.
Yuan, et al.; Article entitled: "Noise Control Principles and Technologies", Northeastern University Press Shenyang, accessed on Apr. 22, 2020, 33 pgs.
Yusuf, Shabbir; Office Action for Chinese patent application No. 201680043097.1, filed Jun. 10, 2016, mailed Jan. 4, 2021, 22 pgs.
Yusuf, Shabbir; Office Action for Chinese patent application No. 201680043097.1, filed Jun. 10, 2016, mailed May 22, 2020, 15 pgs.
Baik, et al; Article entitled: "Acoustic attenuation, phase and group velocities in liquid-filled pipes: Theory, experiment, and examples of water and mercury", The Journal of the Acoustic Society of America, vol. 128, No. 5, Nov. 1, 2010, 15 pgs.
Price, John; Article entitled: "Acoustic Waveguides", Jan. 22, 2008 (Jan. 22, 2008), XP055522269, Retrieved from the inventor: http://spot.colorado.edu/~pricej/downloads/AcousticWaveguides.pdf; retrieved on Nov. 8, 2018, 32 pgs.
Yusuf, Shabbir; Extended European Search Report for serial No. 16812182.0, filed Jun. 10, 2016, mailed Nov. 21, 2018, 22 pgs.
Yusuf, Shabbir; Office Action for European serial No. 16812182.0, filed Jun. 10, 2016, mailed Nov. 22, 2019, 6 pgs.
Yusuf, Shabbir; Office Action for European serial No. 16812182.0, filed Jun. 10, 2016, mailed Nov. 26, 2020, 6 pgs.
Fan, Peng; Article entitled: "Prevention of Industrial Noise and Vibration", Shenyang Publishing House, Dec. 1997, 7 pgs.
Yusuf, Shabbir; Office Action for Chinese patent application No. 201680043097.1, filed Jun. 10, 2016, mailed Apr. 21, 2021, 20 pgs.
Baik, et al.; Article entitled: "Acoustic attenuation, phase and group velocities in liquid-filled pipes: Theory, experiment, and examples of water and mercury", 2010 Acoustical Society of America, published Nov. 2010, 15 pgs.
Yusuf, Shabbir; Notice of Eligibility for Grant for Singapore patent application No. 11201710434V, filed mailed Mar. 29, 2019, 7 pgs.

(56) References Cited

OTHER PUBLICATIONS

Yusuf, Shabbir; Written Opinion for Singapore patent application No. 11201710434V, filed Jun. 10, 2016, mailed May 31, 2018, 6 pgs.
Perrier, Sebastien; Issue Notification for U.S. Appl. No. 15/493,899, filed Apr. 21, 2017, mailed Jan. 30, 2019, 1 pg.
Yusuf, Shabbir; Office Action for Malaysia patent application No. 2017704843, filed Jun. 10, 2016, mailed May 11, 2021, 2 pgs.
Yusuf, Shabbir; Office Action for Canadian patent application No. 2,989,333, filed Jun. 10, 2016, mailed May 4, 2022, 4 pgs.
Yusuf, Shabbir; Summons to Attend Oral Proceedings for European application No. 16812182.0, filed Jun. 10, 2016, mailed Jul. 8, 2022, 7 pgs.
Perrier, Sebastien; Summons to Attend Oral Proceedings for European application No. 18166849.2, filed Apr. 11, 2018, mailed Jun. 16, 2023, 5 pgs.
Yusuf, Shabbir; Office Action for Chinese patent application No. 201680043097.1, filed Jun. 10, 2016, mailed Dec. 27, 2019, 20 pgs.
Perrier, Sebastien; Notice of Allowance for U.S. Appl. No. 15/493,899, filed Apr. 21, 2017, mailed Sep. 24, 2018, 13 pgs.
Perrier, Sebastien; Supplemental Notice of Allowance for U.S. Appl. No. 15/493,899, filed Apr. 21, 2017, mailed Nov. 9, 2018, 6 pgs.
Perrier, Sebastien; Non-Final Office Action for U.S. Appl. No. 16/232,268, filed Dec. 26, 2018, mailed Jun. 13, 2019, 15 pgs.
Perrier, Sebastien; Notice of Allowance for U.S. Appl. No. 16/232,268, filed Dec. 26, 2018, mailed Sep. 6, 2019, 9 pgs.
Perrier, Sebastien; Supplemental Notice of Allowance for U.S. Appl. No. 16/232,268, filed Dec. 26, 2018, mailed Nov. 22, 2019, 6 pgs.
Leinov et al, "Investigation of guided wave propagation and attenuation in pipe buried in sand", J of Sound and Vibration 347 (2015) 96-114.
Long et al., "The effect of soil properties on acoustic wave propagation in buried iron water pipes", AIP Conference Proceedings 615, 1310 (2002).
Perrier, Sebastien; Corrected Notice of Allowance for U.S. Appl. No. 15/493,914, filed Apr. 21, 2017, mailed Feb. 20, 2020, 6 pgs.
Perrier, Sebastien; Corrected Notice of Allowance for U.S. Appl. No. 15/493,914, filed Apr. 21, 2017, mailed Mar. 6, 2020, 6 pgs.
Perrier, Sebastien; Corrected Notice of Allowance for U.S. Appl. No. 15/493,914, filed Apr. 21, 2017, mailed May 22, 2020, 10 pgs.
Perrier, Sebastien; Ex Parte Quayle Action for U.S. Appl. No. 15/493,914, filed Apr. 21, 2017, mailed Jun. 13, 2019, 15 pgs.
Perrier, Sebastien; Non-Final Office Action for U.S. Appl. No. 15/493,914, filed Apr. 21, 2017, mailed Dec. 14, 2018, 19 pgs.
Perrier, Sebastien; Notice of Allowance for U.S. Appl. No. 15/493,914, filed Apr. 21, 2017, mailed Nov. 20, 2019, 19 pgs.
Perrier, Sebastien; Non-Final Office Action for U.S. Appl. No. 15/493,906, filed Apr. 21, 2017, mailed Jul. 5, 2019, 22 pgs.
Perrier, Sebastien; Notice of Allowance for U.S. Appl. No. 15/493,906, filed Apr. 21, 2017, mailed Oct. 2, 2019, 11 pgs.
Perrier, Office Action for European for serial No. 18166849.2, filed Apr. 11, 2018, mailed Feb. 3, 2020, 6 pgs.
Perrier, Office Action for European for serial No. 18166849.2, filed Apr. 11, 2018, mailed Sep. 19, 2019, 5 pgs.
Perrier, Sebastien; Extended European Search Report for serial No. 18166849.2, filed Apr. 11, 2018, mailed Jul. 19, 2018, 7 pgs.
Burtea, Valentin Mircea; Notice of Allowance for U.S. Appl. No. 16/659,333, filed Oct. 21, 2019, mailed Apr. 28, 2020, 18 pgs.
Burtea, Valentin Mircea; Supplemental Notice of Allowance for U.S. Appl. No. 16/659,333, filed Oct. 21, 2019, mailed Jul. 31, 2020, 6 pgs.
Burtea, Valentin Mircea; Supplemental Notice of Allowance for U.S. Appl. No. 16/659,333, filed Oct. 21, 2019, mailed May 6, 2020, 6 pgs.
Huang, N. E., "The empirical mode decomposition and the Hilbert spectrum for nonlinear and non-stationary time series analysis", Proceedings of the Royal Society of London Series A, vol. 454, No. 1971, pp. 903-998, Copyright 1998, 93 pgs.
Long, et al., Article entitled: "Axisymmetric Modes that Propagate in Buried Iron Water Pipes", View Affiliations AIP Conference Proceedings 657:1, Copyright 2003, 1201-1208, 8 pgs.
Amir, et al.; Article entitled: "A discrete model for tubular acoustic systems with varying cross section—the direct and Inverse problems. parts 1 and 2: Theory and experiment," Acustica, 81:450-474 (1995), 25 pgs.
Jonathan A Kemp; "Theoretical and experimental study of wave propagation in brass musical instruments (PhD thesis)," 2002, available at <http://www.kempacoustics.com/thesis/thesis.html>, 232 pgs.
Muggleton, et al..; ,"Axisymmetric wave propagation in buried, fluid-filled pipes: effects of wall discontinuities", Journal of Sound and Vibration 281 (2005) 849-867, 19 pgs.
Muggleton, et al.; "Axisymmetric wave propagation in fluid-filled pipes: wavenumber measurements in vacuo and buried pipes," 581 Journal of Sound and Vibration, 270(1) (2004), 20 pgs.
Muggleton, et al.; "Wavenumber prediction of waves in buried pipes for water leak detection." J. Sound Vib. 2002, 249, 939-954 (2002), 16 pgs.
Almeida, et al.; Article entitled: "On the Acoustic Filtering of the Pipe and Sensor in a Buried Plastic Water Pipe and its Effect on Leak Detection: An Experimental Investigation", Sensors, Copyright 2014, 16 pgs.
Baik, et al; Article entitled: "Acoustic attenuation, phase and group velocities in liquid-filled pipes: Theory, experiment, and examples of water and mercury", J. Acoust. Soc. Am. 128(5), Nov. 2010, 15 pgs.
De Almeida, et al.; Article entitled: "Measurement of Wave Attenuation in Buried Plastic Water Distribution Pipes", Journal of Mechanical Engineering, published on Apr. 1, 2014, 9 pgs.
Oelze, et al.; Article entitled: "Measurement of Attenuation and Speed of Sound in Soils", Soil Sci. Soc. Am. J., vol. 66, May-Jun. 2002, 9 pgs.
Sewerin; Operating Instructions for Combiphon, dated Dec. 10, 2011; 32 pgs.
Burtea, Valentin Mircea; Office Action for Canadian patent application No. 3,090,397, filed Aug. 18, 2020, mailed Dec. 14, 2023, 4 pgs.
Burtea, Valentin Mircea; International Preliminary Report on Patentability for PCT Application No. PCT/US22/37322, filed Jul. 15, 2022, mailed Feb. 1, 2024, 11 pgs.
Perrier, Sebastien; Office Action for Canadian patent application No. 2,999,690, filed Mar. 29, 2018, mailed Jul. 25, 2024, 5 pgs.
Butterfield, Joseph; International Search Report and Written Opinion for PCT Application No. PCT/US24/15230, filed Feb. 9, 2024, mailed May 23, 2024, 12 pgs.
Stewart, Wendy; Office Action for Canadian Patent Application No. 3,090,397, filed Aug. 18, 2020, mailed Sep. 19, 2024, 3 pgs.

\* cited by examiner

ACOUSTIC PIPELINE CONDITION ASSESSMENT AT RESOLUTION DOWN TO PIPE STICK

BRIEF SUMMARY

The present disclosure relates to technologies for providing high-resolution assessment of the condition of pipes of a fluid distribution down to the individual pipe stick. According to some embodiments, a method comprises placing an acoustic sensor in acoustical communication with a pipe at one end of a target segment of the pipe. An acoustical wave is generated in the pipe at a first out-of-bracket excitation location while recording signal data from the acoustic sensor. The signal data represents an arrival of the acoustical wave and reflections from pipe joints within the target segment of the pipe at the acoustic sensor. Timing information regarding the arrival of the reflections from the pipe joints at the acoustic sensor is extracted from the recorded signal data, and a time delay between reflections from consecutive pipe joints is computed utilizing the timing information. An acoustic propagation velocity in a pipe stick between the consecutive pipe joints is then computed based on the time delay and a length of the pipe stick. A condition of the pipe stick is determined based on the computed acoustic propagation velocity.

According to further embodiments, a water distribution system comprises a pipe, first and second acoustic sensors, and an acoustic analysis module executing on a pipe assessment system communicatively coupled to the first and second acoustic sensors. The pipe comprises a plurality of pipe sticks connected by pipe joints. The first and second acoustic sensors are in acoustical communication with the pipe at locations bracketing a target pipe segment and configured to sense acoustical waves propagating through the pipe and produce signal data representing the sensed acoustical waves and reflections from the pipe joints. The acoustic analysis module is configured to record signal data from the first and second acoustic sensors during generation of an acoustical wave in the pipe at a first out-of-bracket excitation location and combine the signal data recorded from the first and second acoustic sensors to produce a first acoustic profile of the target pipe segment. Timing information regarding the arrival of the reflections from pipe joints within the target pipe segment at the first acoustic sensor is extracted from the first acoustic profile, and a time delay between reflections from consecutive pipe joints is computed utilizing the timing information. An acoustic propagation velocity in a first of the plurality of pipe sticks between the consecutive pipe joints is computed based on the time delay and a length of the pipe sticks, and the condition of the first of the plurality of pipe sticks is computed based on the computed acoustic propagation velocity.

According to further embodiments, a computer-readable medium comprises processor-executable instructions that cause a processor of a pipe assessment system to record signal data from an acoustic sensor in acoustical communication with a pipe at one end of a target pipe segment during generation of an acoustical wave in a pipe of a fluid distribution system at a first out-of-bracket excitation location, the signal data representing an arrival of the acoustical wave and reflections from pipe joints within the target segment of the pipe at the acoustic sensor. A first acoustic profile for the target segment is extracted from the signal. The processor records signal data from the acoustic sensor placed at the other end of the target segment during generation of an acoustical wave in the pipe at a second out-of-bracket excitation location at an opposite end of the target segment, and a second acoustic profile for the target segment is extracted from the signal data. The first acoustic profile and the second acoustic profile are combined, and timing information regarding the arrival of reflections from the pipe joints at the acoustic sensor(s) is extracted from the combined acoustic profiles. The processor computes a time delay between reflections from consecutive pipe joints utilizing the timing information and then compute an acoustic propagation velocity in a pipe stick between the consecutive pipe joints based on the time delay and a length of the pipe stick. The processor then determines a condition of the pipe stick based on the computed acoustic propagation velocity.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
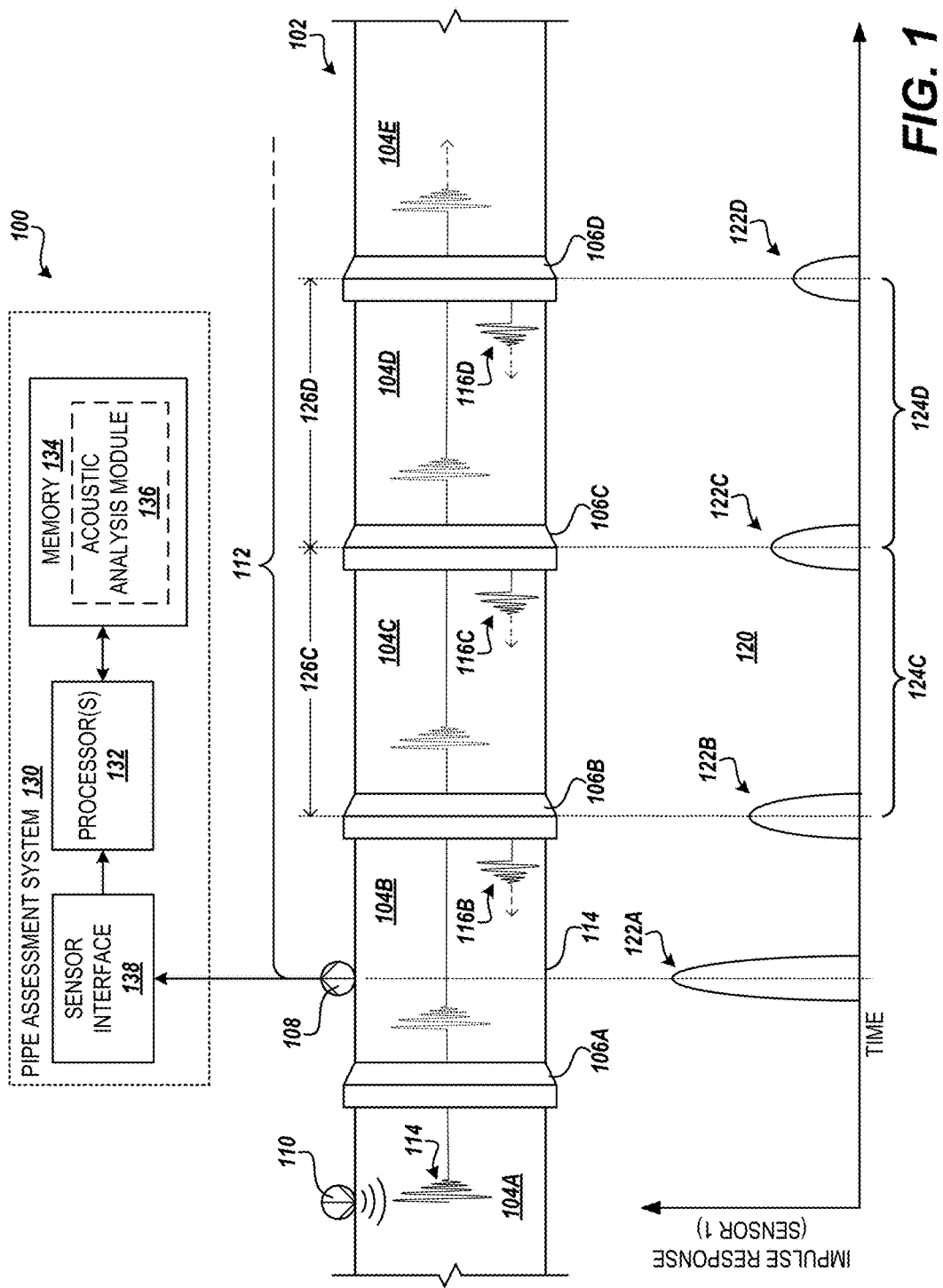
FIG. 1 is a block diagram showing an illustrative environment in which technologies for providing high-resolution assessment of the condition of pipes of a fluid distribution down to the individual pipe stick may be implemented, according to embodiments presented herein.

The following detailed description is directed to technologies for providing high-resolution assessment of the condition of pipes of a fluid distribution down to the individual pipe stick. Water distribution mains may degrade in several ways. For example, metal pipe walls may corrode and become thinner and weaker (less stiff). Asbestos cement pipes lose calcium and the wall loses strength in time. The wall of pre-stressed concrete pipes gets weaker if the steel wires break. These degradations may cause hydraulic failure of the distribution system.

As described in, e.g., U.S. patent application Ser. No. 09/570,922, filed May 15, 2000, and issued as U.S. Pat. No. 6,561,032; U.S. patent application Ser. No. 11/156,573, filed Jun. 21, 2005, and issued as U.S. Pat. No. 7,328,618; and U.S. patent application Ser. No. 11/952,582, filed Dec. 7, 2007, and issued as U.S. Pat. No. 7,475,596, the disclosures of which are incorporated herein by this reference in their entireties, methods for assessing the condition of, e.g., predicting the stiffness and/or wall thickness of, pipes of a water or other fluid distribution system may rely on measuring the propagation velocity of sound (referred to herein as "acoustical propagation velocity") in a given pipe segment. The acoustical propagation velocity may be determined by placing two acoustic or vibration sensors on the pipe, on associated appurtenances, or in contact with the fluid at known locations bracketing the pipe segment under test and generating an out-of-bracket sound. The sound propagates along the pipe segment reaching first the near acoustic sensor, i.e. the sensor closest to the sound generator, and then the far acoustic sensor. The signals from the two sensors are recorded, and signal processing is applied to estimate the time delay between the sound reaching the near and far sensors (i.e., the time it takes for the sound to travel from one sensor to the other).

With a known distance between the two acoustic sensors and the estimated time delay, the acoustical propagation velocity of the sound in the pipe segment under test may be determined. The measured acoustical propagation velocity may then be compared with a reference speed of sound for that specific pipe class and material, with any differences used to determine the condition of the target pipe segment. While these methods generally work well, only a general condition of the pipe segment bracketed by the two sensors as a whole is assessed, and not changes in condition of the pipe along the length of the segment on a local scale. Different sections of the pipe segment may be in different condition.

According to embodiments described herein, systems and methods for estimating the acoustical propagation velocity in one or more sections of a pipe segment may be implemented, providing pipe condition information with greater resolution. The concept relies on the fact that water pipes are traditionally made of several individual sections of pipe, or "pipe sticks," with uniform and known length, such as around 20 ft., connected together to form the pipe segment. Each pipe joint between two adjacent pipe sticks presents a local increase in pipe diameter and wall thickness that results in a local variation of the acoustic impedance. This local change causes reflections of the sound induced in the pipe during condition testing to occur. A single acoustic sensor on the pipe can detect the reflections from two or more of these pipe joints, and by utilizing signal processing techniques described herein the timing of the reflections as detected by the acoustic sensor can be extracted from the recorded signals and the time between two consecutive reflections can be measured. Knowing the length of a pipe stick and the time delay between two consecutive reflections, the acoustical propagation velocity of the acoustic wave for a given pipe stick can be determined, and the condition of that particular pipe stick ascertained.

FIG. 1 and the following description are intended to provide a general description of suitable environments in which the embodiments described herein may be implemented. In particular, FIG. 1 shows an environment 100 for assessing the condition of pipes of a fluid distribution down to the level of the individual pipe stick, according to embodiments described herein. The environment 100 includes a portion of a pipe 102 of a fluid network, such as a main in a water or other fluid distribution system. According to embodiments, the pipe 102 comprises multiple pipe sticks 104A-104E (referred to herein generally as "pipe stick 104"). The pipe sticks 104A-104E may generally be of uniform length and construction, and are connected together by pipe joints, such as joints 106A-106D (referred to herein generally as "joint 106"). The joints 106 may be integral to each pipe stick 104, as shown in the figure, or comprise a separate pipe coupling or fitting. The fluid network may be partially or wholly subterranean, or portions of the fluid network may be subterraneous, while other portions of the fluid network may be non-subterraneous (i.e., above ground). For example, the pipe 102 may be partially or wholly subterraneous, while valves, hydrants, and other appurtenances connected to the pipe may be accessible below ground and/or located above ground.

The environment 100 further includes at least one vibration or acoustic sensor 108 in acoustical communication with the pipe 102. For purposes of this disclosure, a component or device being "in acoustical communication with" a pipe represents the component being directly or indirectly coupled to the pipe in such a way that vibrations, acoustical impulses, or other variations in pressure traveling through the pipe wall and/or the fluid in the pipe can be produced or sensed by the component. In some embodiments, the acoustic sensor 108 may comprise transducers or accelerometers attached directly to the outer wall of the pipe 102 or to a valve, hydrant or other appurtenance of the fluid distribution system in fluid communication with the pipe. The transducers or accelerometers may measure the instantaneous acceleration of the pipe wall or appurtenance from vibrations caused by the sound pressure in the pipe 102. The measured acceleration of the wall constitutes an indirect measurement of sound pressure in the pipe 102. In further embodiments, the acoustic sensor 108 may include hydrophones, transducers, accelerometers, or any combination of these and other sensors known in the art for measuring vibrations or acoustic signals.

Acoustical waves are introduced into the pipe 102 by an excitation source 110 at an "out-of-bracket" position, i.e., outside of a target pipe segment 112 for condition assessment. In some embodiments, the acoustical waves may comprise one or more acoustical impulses 114, vibrations, or pressure waves generated in the fluid path of the pipe 102. The excitation source 110 may represent any means suitable for the creation of an acoustical excitation in the pipe 102, including a manually actuated device, such as manual excitation by a human using a hammer to strike the pipe wall, an above-ground appurtenance, or the ground above the subterraneous pipe. The excitation source may also represent a mechanical device, such as a motorized hammer or piston. In further embodiments, a continuous acoustic excitation source 110 with abroad frequency range (e.g., at least 100 Hz) may be utilized, such as a speaker, hydrophone, or fluid flow. According to further embodiments, the excitation source 110 is located outside the immediate proximity of the acoustic sensor 108, e.g. at least 10 meters of separation, to avoid the sensor sensing multiple modes of vibration from the excitation.

When an acoustical wave, such as acoustic impulse 114, are introduced in the pipe 102 by the excitation source 110, the wave propagates longitudinally along the length of the pipe 102 at various speeds depending on the condition of each pipe stick 104, as discussed above. The joints 106 between each pipe stick 104 cause reflections of the acoustic impulse 114, such as reflection 116B from joint 106B, reflection 116C from joint 106C, and reflection 116D from joint 106D (referred to herein generally as "reflections 116"), that travel longitudinally in the opposite direction from the acoustic impulse 114.

The acoustic sensor 108 senses the acoustical impulse 114 and the reflections 116 in the pipe 102 and produces a signal representing the sensed pulses. A pipe assessment system 130 may then process and analyze the signal data from the acoustic sensor 108 to assess the condition of the target pipe segment 112, or more specifically the condition of the individual pipe sticks, such as pipe sticks 104C and 104D, contained within the target segment. According to embodiments, the pipe assessment system 130 extracts timing information regarding the acoustical impulse 114 and reflections 116 from the signal data from the acoustic sensor 108. For example, the pipe assessment system 130 may utilize signal processing techniques described herein to determine the timing of the arrival of the acoustical impulse 114 (as shown at 122A) and reflections 116B-D (as shown at 122B-D, respectively) at the longitudinal position of the acoustic sensor 108 along the pipe 102, as shown in the graph 120 of FIG. 1.

From these timings, a time delay between arrival at the acoustic sensor 108 of consecutive reflections may be computed, such as time delay 124C between arrival of reflections 116B and 116C and time delay 124D between arrival of reflections 116C and 116D. Utilizing the computed time delays 124C and 124D and the known lengths 126C and 126D of the pipe sticks 104C and 104D, respectively, the acoustic propagation velocities within each pipe stick may be computed and the condition of the pipe sticks 104C and 104D estimated. It will be appreciated that the target pipe segment 112 may encompass any number of pipe sticks 104 of which the pipe assessment system 130 may estimate the condition, depending on the frequencies and maximum propagation length of the acoustical wave. Attenuation of the reflections 116 traveling along the pipe 102 may practically limit the total length of the segment to 200 m for accurate condition assessment.

Generally, the pipe assessment system 130 represents a collection of computing resources for the processing and analysis of the signal data received from one or more acoustic sensors 108 and the determination of pipe condition. According to embodiments, the pipe assessment system 130 may comprise one or more computer devices and/or computing resources connected together utilizing any number of connection methods known in the art. For example, the pipe assessment system 130 may comprise a mobile computer device, such as a laptop or tablet, deployed in the field in proximity to the target pipe segment 112. Alternatively or additionally, the pipe assessment system 130 may comprise laptop or desktop computers; tablets, smartphones or mobile devices; server computers hosting application services, web services, database services, file storage services, and the like; and virtualized, cloud-based computing resources, such as processing resources, storage resources, and the like, that receive the signal data from the acoustic sensors 108 through one or more intermediate communication links or networks.

According to embodiments, the pipe assessment system 130 includes one or more processor(s) 132. The processor(s) 132 may comprise microprocessors, microcontrollers, cloud-based processing resources, or other processing resources capable of executing instructions and routines stored in a connected memory 134. The memory 134 may comprise a variety non-transitory computer-readable storage media for storing processor-executable instructions, data structures and other information within the pipe assessment system 130, including volatile and non-volatile, removable and non-removable storage media implemented in any method or technology, such as RAM; ROM; FLASH memory, solid-state disk ("SSD") drives, or other solid-state memory technology; compact disc ROM ("CD-ROM"), digital versatile disk ("DVD"), or other optical storage; magnetic hard disk drives ("HDD"), hybrid solid-state and magnetic disk ("SSHD") drives, magnetic tape, magnetic cassette, or other magnetic storage devices; and the like.

In some embodiments, the memory 134 may include an acoustic analysis module 136 for performing the acoustic analysis of the signal data from the acoustic sensors 108 to perform high-resolution assessment of the pipe 102 down to the individual pipe stick 104, as described herein. The acoustic analysis module 136 may include one or more software programs, components, and/or modules executing on the processor(s) 132 of the pipe assessment system 130. The acoustic analysis module 136 may further include hardware components specifically designed to perform one or more steps of the routines described herein. According to further embodiments, the memory 134 may store processor-executable instructions that, when executed by the processor(s) 132, perform some or all of the steps of the routines 200 and 500 described herein for providing high-resolution assessment of the condition of pipes of a fluid distribution down to the individual pipe stick, as described in regard to FIGS. 2 and 5.

The pipe assessment system 130 may be in direct communication with the acoustic sensor(s) 108 over a wired connection or may be indirectly connected to the sensors through one or more intermediate communication links and/or computing devices. For example, a laptop may be connected to the acoustic sensor(s) 108 via one or more radio-frequency ("RF") links to receive signal data from the sensors in real-time. In other embodiments, the signal data from an acoustic sensor 108 may be received by an individual computing device (referred to as a "node") and sent to a central analysis computer for processing and analysis. In such embodiments, it may be necessary to ensure that the clocks of the individual nodes are synchronized or share a highly accurate time source in order to ensure accurate timing accompanies the signal data from respective acoustic sensor(s) 108.

According to some embodiments, the processor(s) 132 are operatively connected to acoustic sensor(s) 108 through a sensor interface 138. The sensor interface 138 allows the processor(s) 132 to receive the signals from the sensors representative of the sensed acoustical waves and reflections 116 in the pipe 102. For example, the sensor interface 138 may utilize one or more analog-to-digital converters ("ADCs") to convert an analog voltage output of the acoustic sensor(s) 108 to a digital value that is sampled by the processor(s) 132 at a specific sampling rate sufficient to represent the acoustical waves and reflections 116 in the signal data. According to some embodiments, a sampling rate around 10 kHz may be utilized to capture data representing the frequencies of interest in the pulses. In further embodiments, a sound processing unit or "sound card" of the laptop computer may be utilized to provide the sampling functionality.

It will be appreciated that the structure and/or functionality of the pipe assessment system 130 may be different than that illustrated in FIG. 1 and described herein. For example, one or more of the processor(s) 132, memory 134, sensor interfaces 138, and/or other components and circuitry described may be integrated within a common integrated circuit package or distributed among multiple integrated circuit packages in one or more computing devices. In some embodiments, some or all of the processing and analysis described herein may be implemented as software applications on mobile computing platforms, such as a smartphone or laptop with cellular networking capability. Similarly, the illustrated connection pathways are provided for purposes of illustration and not of limitation, and some components and/or interconnections may be omitted for purposes of clarity. It will be further appreciated that pipe assessment system 130 may not include all of the components shown in FIG. 1, may include other components that are not explicitly shown in FIG. 1, or may utilize architectures completely different than those shown in FIG. 1.

Figure 2:
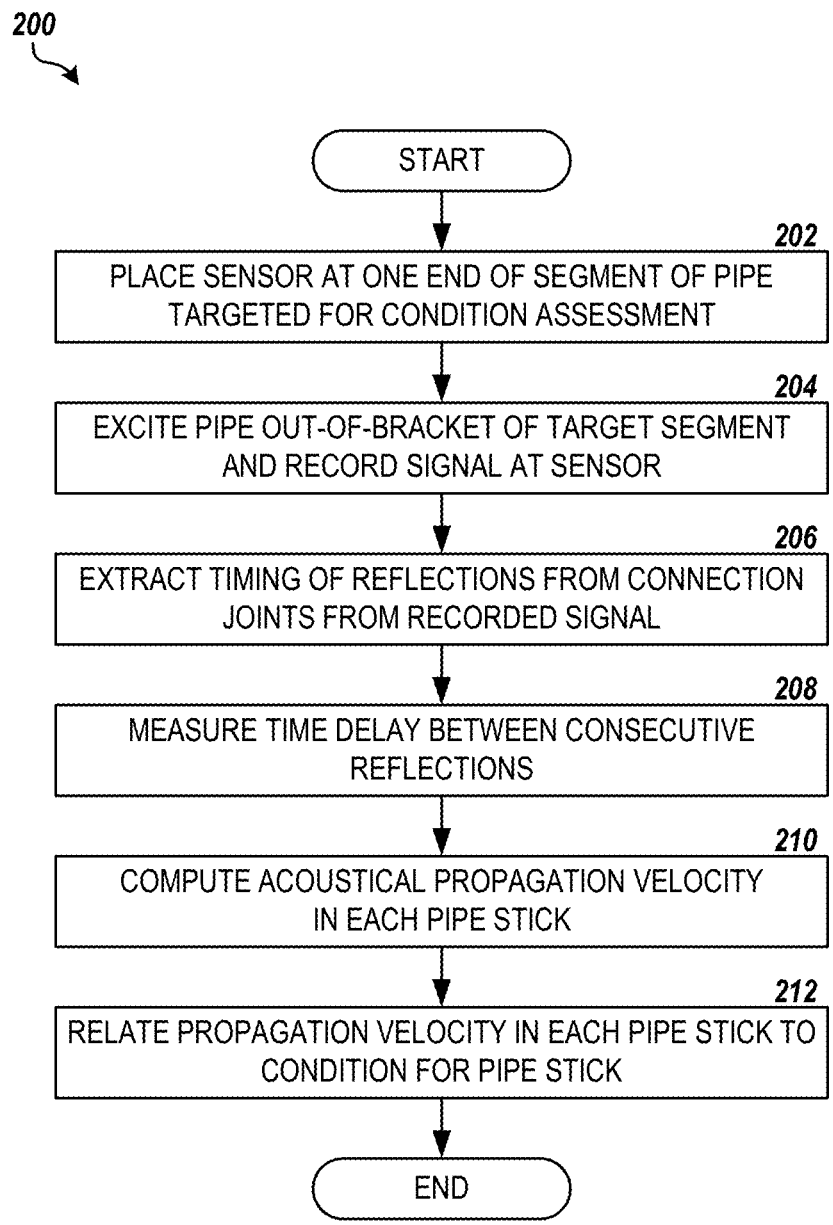
FIG. 2 is a flow diagram showing one routine for assessing the condition of pipes in a fluid distribution system down to the individual pipe stick using pulse reflectometry, according to embodiments presented herein.

FIG. 2 illustrates one routine 200 for performing high-resolution assessment of the condition of pipes of a fluid distribution down to the individual pipe stick, according to some embodiments. In some embodiments, parts of the routine 200 may be performed by the acoustic analysis module 136 executing on a laptop computer in direct connection with an acoustic sensor 108 associated with a target pipe segment 112 containing one or more pipe sticks, such as pipe sticks 114C and 114D shown in FIG. 1, for condition assessment. In other embodiments, the routine 200 may be performed by some combination of the processor(s) 132, computing devices, components, and modules of the pipe assessment system 130 in conjunction with parameters, data, and/or instructions provided with maintenance personnel associated with the fluid distribution system.

The routine 200 begins at step 202, where an acoustic sensor 108 is placed at one end of the target pipe segment 112 encompassing the pipe sticks 104 for condition assessment. The acoustic sensor 108 may be placed on an exposed section of the pipe 102 and/or a readily accessible appurtenance, such as a valve, hydrant, or the like. The acoustic sensor 108 may be connected to the pipe assessment system 130 either wirelessly or wired, or the acoustic sensor may be indirectly connected to the pipe assessment system through one or more intermediate computing devices or nodes connected to the pipe assessment system via a network.

Next, the routine 200 proceeds from step 202 to step 204, where an excitation of the pipe 102 by an excitation source 110 is performed while signal data from the acoustic sensor 108 is recorded by the pipe assessment system 130. According to embodiments, the location of the excitation along the pipe 102 is out-of-bracket of the target pipe segment 112 at some distance from the acoustic sensor 108, e.g. at least 10 meters from the sensor, to avoid the sensor sensing multiple modes of vibration from the excitation. As described above, the excitation introduces an acoustical wave into the pipe 102 that propagates longitudinally along the length of the pipe and it is observed by the acoustic sensor 108. In addition, the sound wave travels further through the pipe 102 and is reflected by the joints 106 connecting adjacent pipe sticks 104. The reflections 116 propagate in the pipe 102 in opposite direction reaching the acoustic sensor 108 after a certain time delay.

From step 204, the routine 200 proceeds to step 206, where the pipe assessment system 130 processes the signal data recorded from acoustic sensor 108 to extract timing information regarding the arrival of the reflections 116 at the sensor. For example, the pipe assessment system 130 may utilize a variety of signal processing techniques based on pulse reflectometry to ascertain the times of arrival at the acoustic sensor 108 of the reflection 116B from the joint 106B, the reflection 116C from the joint 106C, and the reflection 116D from the joint 106D. For example, the pipe assessment system may utilize signal conditioning and auto-correlation processes such as those described herein in regard to FIGS. 5 and 6.

The routine 200 proceeds from step 206 to step 208, the pipe assessment system 130 utilizes the timing information to measure time delays between the arrival of consecutive reflections 116 at the acoustic sensor 108. For example, the pipe assessment system 130 may measure the time delay 124C between arrival of reflections 116B and 116C and time delay 124D between arrival of reflections 116C and 116D. Next, as step 210, the pipe assessment system 130 utilizes the computed time delays and the known lengths of the pipe sticks to compute an acoustical propagation velocity associated with each pipe stick 104 in the target pipe segment 112. For example, the pipe assessment system 130 may determine the acoustical propagation velocity $c_n$ in pipe stick n, such as pipe sticks 104C and 104D using the computed time delays $\Delta t_n$, such as time delays 124C and 124D, and the respective lengths $l_n$, such as lengths 126C and 126D, utilizing the following formula:

$$c_n = 2\frac{l_n}{\Delta t_n}$$

The routine 200 then proceeds from step 210 to step 212, where the pipe assessment system 130 associates the acoustical propagation velocities $c_n$ computed for each pipe stick 104 with a condition of the pipe stick. For example, the acoustical propagation velocity computed for the pipe stick 104 may be compared with a reference speed of sound for that specific pipe class and material, with any differences used to determine the condition of the section. From step 212, the routine 200 ends.

Figure 3:
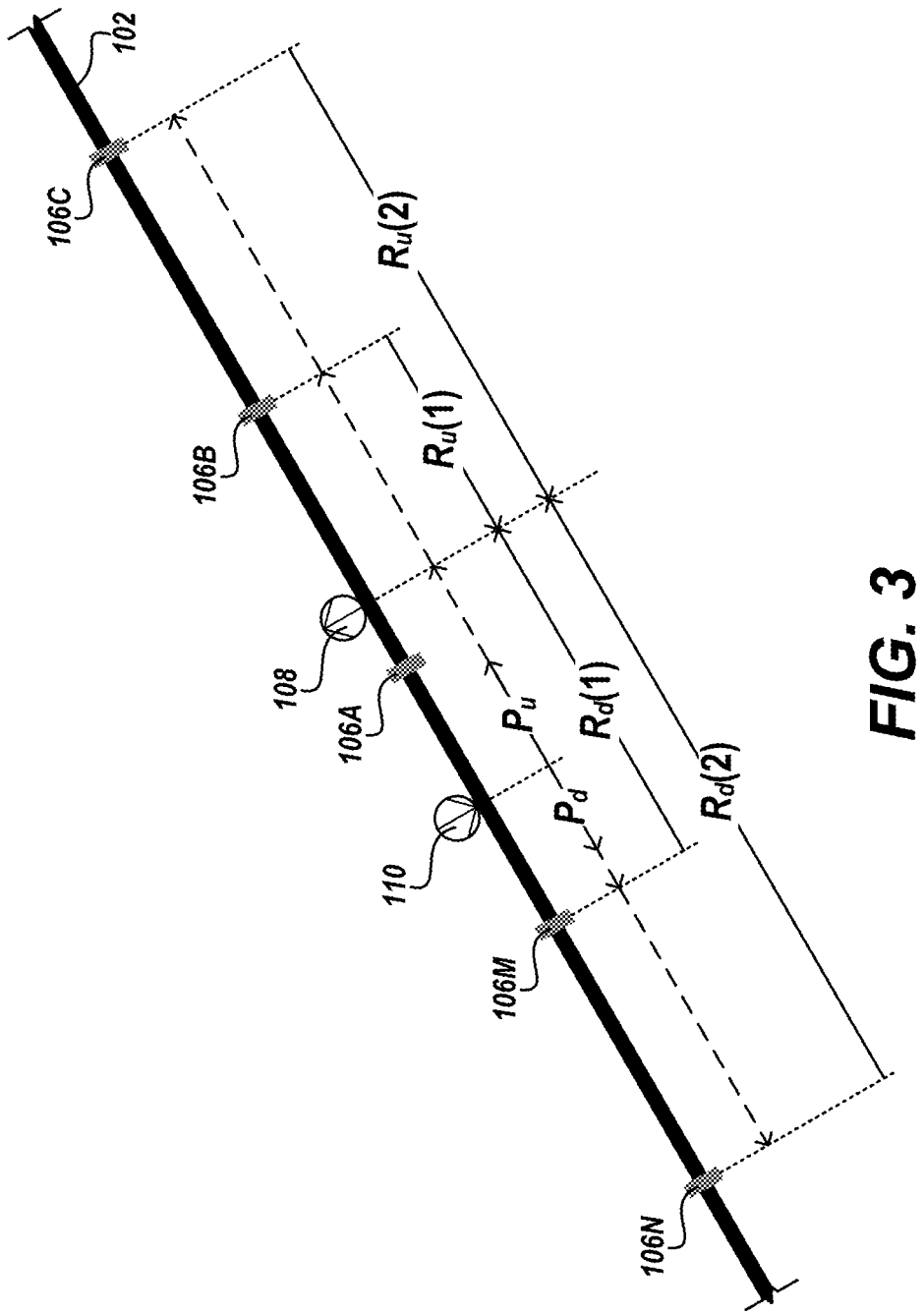
FIG. 3 is a block diagram of a pipe segment illustrating specific aspects of the use of pulse reflectometry in assessing the condition of pipes in a fluid distribution system, according to embodiments presented herein.

FIG. 3 shows additional aspects of utilizing pulse reflectometry in the environment 100 described above to assess the condition of pipes in a fluid distribution system down to the individual pipe stick. Conventional methods of utilizing pulse reflectometry generally rely on the sound being induced in a unique direction, so that all the reflections are coming from object(s) under test. As described above in regard to FIG. 1, when an acoustical wave, such as acoustic impulse 114, is introduced in the pipe 102 by the excitation source 110, the impulse propagates along the length of the pipe 102 upstream to the acoustic sensor 108 and beyond, denoted as $P_u$ in FIG. 3. The reflections 116 from upstream joints between pipe sticks 104, such as pipe joints 106B and 106C, travel back to the acoustic sensor 108 in the opposite direction, denoted as $R_u(1)$ and $R_u(2)$, respectively. The acoustic sensor 108 senses the reflections $R_u(1)$ and $R_u(2)$ and the timings of the arrival of these reflections at the sensor can be determined by the pipe assessment system 130 from the signal data received from the sensor.

It will be appreciated, however, that the acoustic impulse 114 will also propagate through the pipe 102 in the downstream direction as well, denoted in FIG. 3 as $P_d$. Reflections 116 from any downstream joints, such as pipe joints 106M and 106N, will also travel back to and be sensed by the acoustic sensor 108, as denoted by $R_d(1)$ and $R_d(2)$, respectively. Because the reflections $R_d(1)$ and $R_d(2)$ travel a similar distance to reflections $R_u(1)$ and $R_u(2)$, they will present similarly in the signal data to the useful ones. The periodicity of the reflections $R_d(1)$ and $R_d(2)$ will also be similar to the useful reflections $R_u(1)$ and $R_u(2)$, as the downstream pipe sticks 104 are very likely of the same type and length as the upstream pipe sticks for which condition assessment is desired. Thus the presence of downstream reflections 116, such as reflections $R_d(1)$ and $R_d(2)$, may limit the ability of the pipe assessment system 130 to extract accurate timing information regarding the useful reflections $R_u(1)$ and $R_u(2)$ needed for accurate estimation of condition of the target pipe sticks 104. To address this problem, signal data from additional acoustic sensor(s) 108 and/or recordings from additional excitation locations may be utilized to reduce the influence of undesirable downstream reflections in the signal data, as shown in FIGS. 4A and 4B and described below.

Figure 4A:
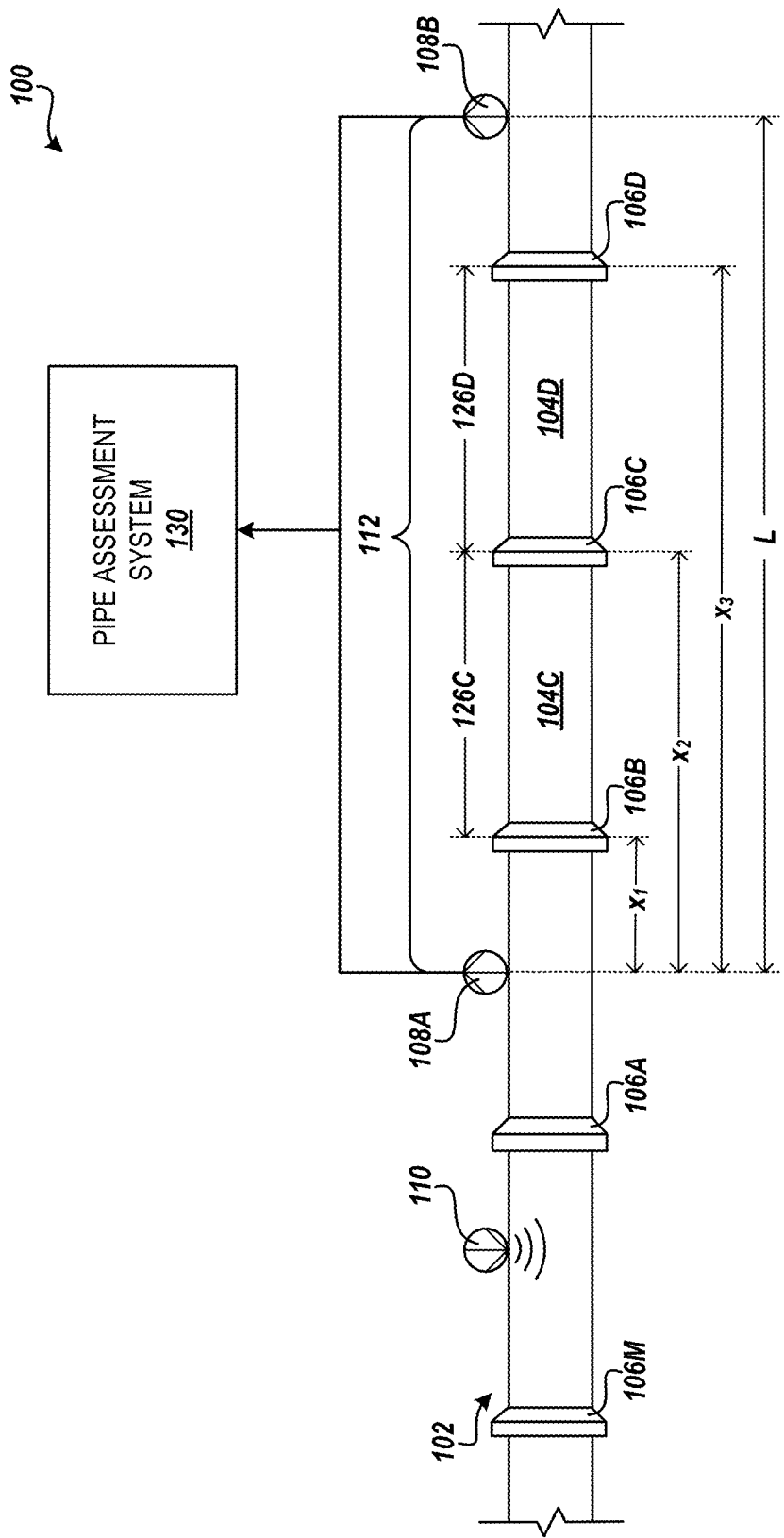
FIGS. 4A-4B are block diagrams showing additional illustrative environments for providing high-resolution assessment of the condition of pipes of a fluid distribution down to the individual pipe stick, including the use of multiple acoustic sensors and/or multiple out-of-bracket excitations, according to embodiments presented herein.
Figure 4B:
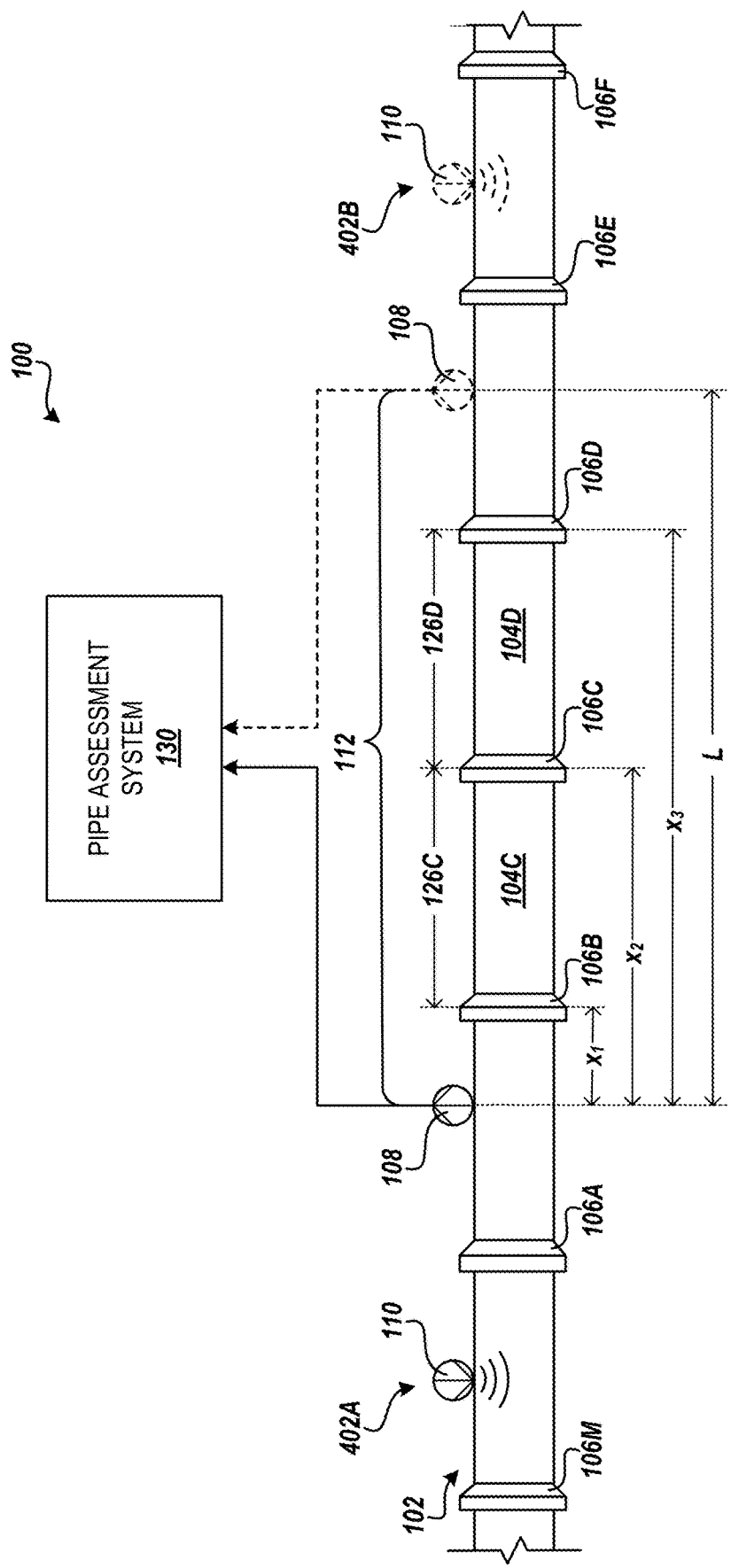

In some embodiments, the environment 100 may further include an additional acoustic sensor 108B placed in acoustical communication with the pipe 102 and connected to pipe assessment system 130, as shown in FIG. 4A. The target pipe segment 112 containing the pipe sticks, such as pipe stick 104C and 104D, for condition assessment is bracketed by the first and second acoustic sensors 108A and 108B. As described above in regard to FIG. 3, an acoustic impulse 114 introduced in the pipe 102 by the excitation source 110 propagates upstream and downstream along the length of the pipe (e.g., $P_u$ and $P_d$ from FIG. 3), reaching the first acoustic sensor 108A and then the second acoustic sensor 108B. Reflections 116 of the acoustic impulse 114 from upstream joints 106B-106D associated with the pipe sticks 104C, 104D for which condition assessment is desired (e.g., $R_u(1)$ and $R_u(2)$) propagate in the opposite direction back to the first acoustic sensor 108A. Reflections 116 of the acoustic impulse 114 from any downstream joints, such as joint 106M, propagate back to the first acoustic sensor 108A and then to second acoustic sensor 108B.

The signal recorded from the first acoustic sensor 108A should have an impulse response function $h_1(t)$ of:

$$h_1(t) = p(t) + r_u(t) + r_d(t)$$

where p(t) is a portion of the signal contributed by the generated acoustic impulse 114, $r_u(t)$ is a portion of the signal contributed by the reflections 116 from upstream joints (the "useful" reflections), and $r_d(t)$ is a portion of the signal contributed by the reflections from downstream joints (the "undesirable" reflections). Similarly, the impulse response function $h_2(t)$ for the signal recorded at the second acoustic sensor 108B may be expressed as:

$$h_2(t) = \alpha(p(t) + r_d(t))$$

where p(t) and $r_d(t)$ are the same signal components as in $h_1$ and $\alpha$ is an attenuation factor to account for attenuation of the pulses travelling to the far sensor.

The representation of the signal of interest $r_u(t)$ for the extraction of the timing information to perform condition assessment of the pipe sticks 104B and 104C, therefore, may be obtained by normalizing the signals $h_1(t)$ and $h_2(t)$ and then subtracting the two signals, i.e.:

$$r_u(t) = h_1(t) - \frac{h_2(t)}{\alpha}$$

with the component $r_d(t)$ representing the signal contributed by the undesirable reflections removed. This assumes a same attenuation factor $\alpha$ for both the acoustical impulse 114 and the downstream reflections 116. In some embodiments, the attenuation factor may be determined directly by a comparison of the acoustic impulse as received by the respective acoustic sensors 108A and 108B. In other embodiments, the attenuation may be predetermined through experimentation based on the length L, type, material, and/or expected condition of the target pipe segment 112 or through other acoustic attenuation models known in the art.

According to further embodiments, to reduce the influence of undesirable downstream reflections affecting the extraction of the timing information, the generation of the acoustic impulse 114 and recording of signal reflections 116 may be performed in two directions, as shown in FIG. 4B. The pipe 102 is excited by the excitation source 110 at a first out-of-bracket location 402A and the signal data is recorded at the acoustic sensor 108 positioned at a first end of the target pipe segment 112, as described above. The impulse response function h(t) for the resulting signal recorded at the acoustic sensor 108 during the first excitation is expressed as:

$$h(t) = p_1(t) + r_u(t) + r_d(t)$$

where $p_1(t)$ is a portion of the signal contributed by the generated acoustic impulse 114 at the first position, $r_u(t)$ is a portion of the signal contributed by the reflections 116 from upstream joints (the useful reflections), e.g., joints 106B-106D, and $r_d(t)$ is a portion of the signal contributed by the reflections from downstream joints (the undesirable reflections), e.g. joint 106M, as described above.

The acoustic sensor 108 may then be moved to the other end of the target pipe segment 112, and the pipe excited at a second out-of-bracket location 402B generating acoustical impulses traveling in opposite directions (with reference to the directions labeled "upstream" and "downstream" herein) from those generated at the first location 402A. The impulse response function g(t) for the signal recorded at the acoustic sensor 108 during the second excitation can be expressed as:

$$g(t) = p_2(t) + s_u(t) + s_d(t)$$

where $p_2(t)$ is a portion of the signal contributed by the acoustic impulse 114 generated at the second location 402B, $s_u(t)$ is a portion of the signal contributed by the reflections 116 from upstream joints (the reflections of interest), e.g., joints 106D-106B, and $s_d(t)$ is a portion of the signal contributed by the reflections from downstream joints (the undesired reflections), e.g. joint 106F.

Therefore, the section of interest from the two recordings taken during excitation at the two out-of-bracket locations 402A and 402B is represented by components $r_u(t)$ and $s_u(t)$, respectively, and it will be appreciated that the component $r_u(t)$ should be substantially similar to the time-reversed component $s_u(t)$ over the target pipe segment 112. In other words:

$$r_u(t) \approx s_u(-t)$$

Expressing these components in terms of the distance x from the first end of the target pipe segment 112 (i.e., the location of the acoustic sensor 108 for the first excitation) and the speed of sound c instead of time t, we get:

$$r_u(t) = r_u\left(\frac{2x}{c}\right)$$

$$s_u(-t) = s_u\left(\frac{2L}{c} - \frac{2x}{c}\right)$$

$$r_u\left(\frac{2x}{c}\right) \approx s_u\left(\frac{2L}{c} - \frac{2x}{c}\right)$$

According to some embodiments, the similar components of interest $r_u(t)$ and $s_u(-t)$ characterizing the target pipe segment 112 under test can be extracted by cross-correlating the impulse response function h(t) in the signal data recorded during the excitation at the first location 402A with the time-reversal of the impulse response function g(t) in the signal data recorded during the excitation at the second location 402B. It is noted that the cross-correlation of h(t) with time-reversed g(t), is mathematically equivalent with the convolution of the two signals. An alternative way to emphasize the component of interest in the signal data is to simply add the impulse response h(t) with the time-reversed impulse response g(t), or g(−t), after aligning h(t) and g(−t) utilizing the propagation delay of the acoustic impulse 114 along the segment under test. This should result in the amplitude of the peaks in the signal data representing the reflections of interest being doubled. It will be further appreciated that the method of utilizing two excitations at two out-of-bracket locations 402A and 402B described in regard to FIG. 4B could be combined with the method of utilizing two acoustic sensors 108A and 108B described in regard to FIG. 4A to further reduce the influence of undesirable downstream reflections affecting the extraction of the timing information.

In order to isolate the component(s) of interest for the extraction of timing information utilizing the methods described above, the impulse response functions, e.g., $h_1(t)$, $h_2(t)$, g(t), etc., need to be accurately estimated. According to some embodiments, the impulse response could be given by the transfer function between the signal recorded at the acoustic sensor(s) 108 and a prototypical acoustic impulse created by the excitation(s). For example, a reference bank of prototypical acoustic impulses created by different excitation sources 110 on pipes 102 of different types may be maintained in the memory 134 of the pipe assessment system 130. The acoustic analysis module 136 may select a prototypical acoustic impulse from the reference bank based on a type of the pipe 102, e.g., concrete or metal, and/or a type of the excitation source 110, e.g., hammer on pipe surface vs. ground impact, and used in the transfer function to derive an impulse response function from the signal(s) recorded at the acoustic sensor(s) 108.

In other embodiments, it can be assumed that the auto-correlation of the signal(s) represented in the signal data is representative of the underlying impulse response. While the auto-correlation of the signal(s) may not yield an exact representation of the impulse response, it emphasizes the reflections caused by different pipe appurtenances, including pipe joints 106. However, using the auto-correlation signal to estimate the impulse response may present oscillations caused by the band-limited nature of the signal that do not represent the structure of the pipe. Utilizing an auto-correlation envelope removes these inherent oscillations, however, and presents the signal variation of interest for extracting the timing information. It will also be necessary to remove the contribution of the generated acoustic impulse 114, which will be dominant in the auto-correlation function. From the auto-correlation envelope (also referred to herein as "acoustic profiles"), time delay estimates may be found using the cross-correlation of the two signals, the time-of-flight estimate, or other methods known in the art.

Figure 5:
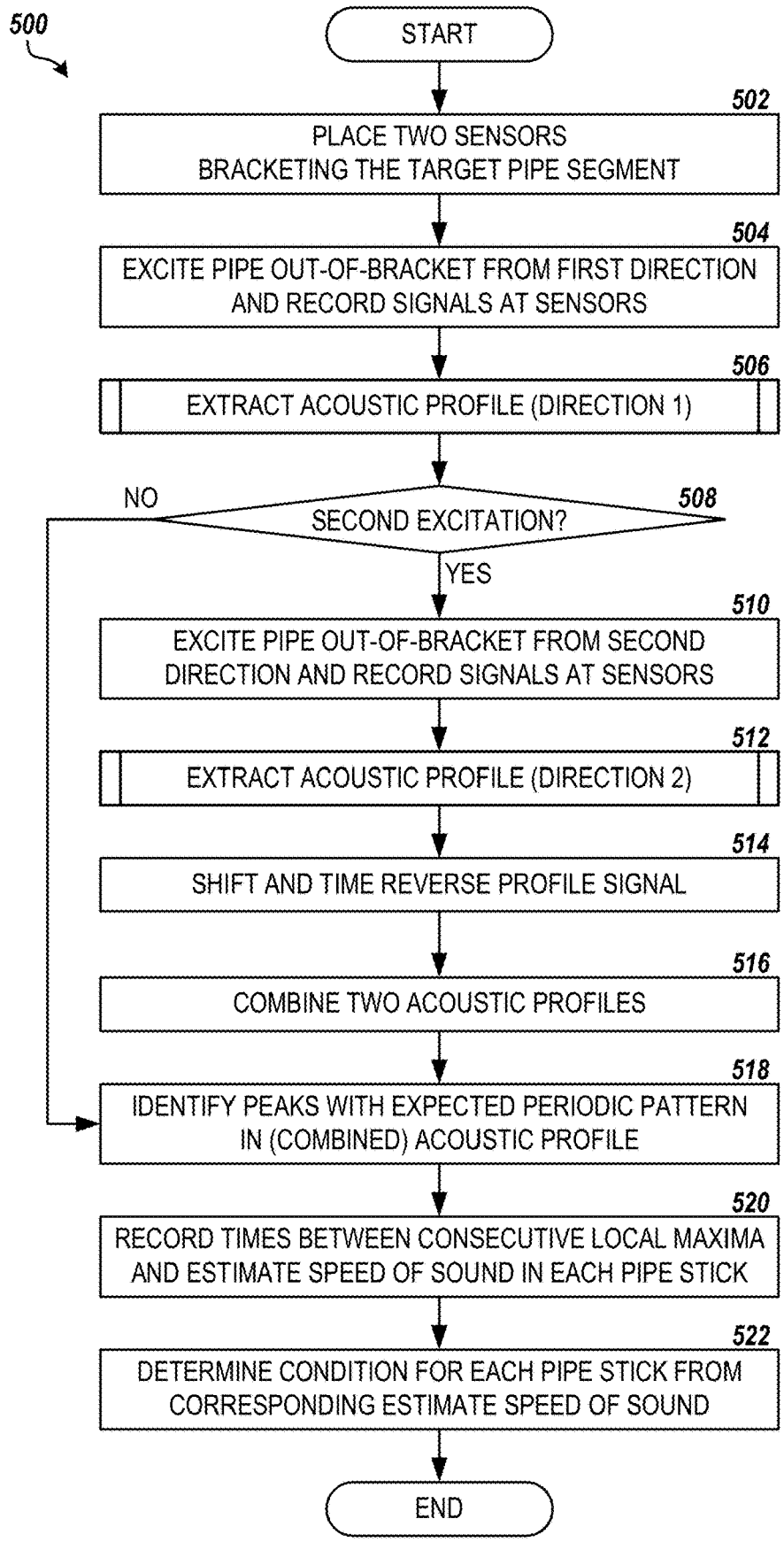
FIG. 5 is a flow diagram showing one routine for performing high-resolution assessment of the condition of pipes of a fluid distribution down to the individual pipe stick utilizing multiple acoustic sensors and/or multiple out-of-bracket excitations, according to embodiments presented herein.
Figure 6:
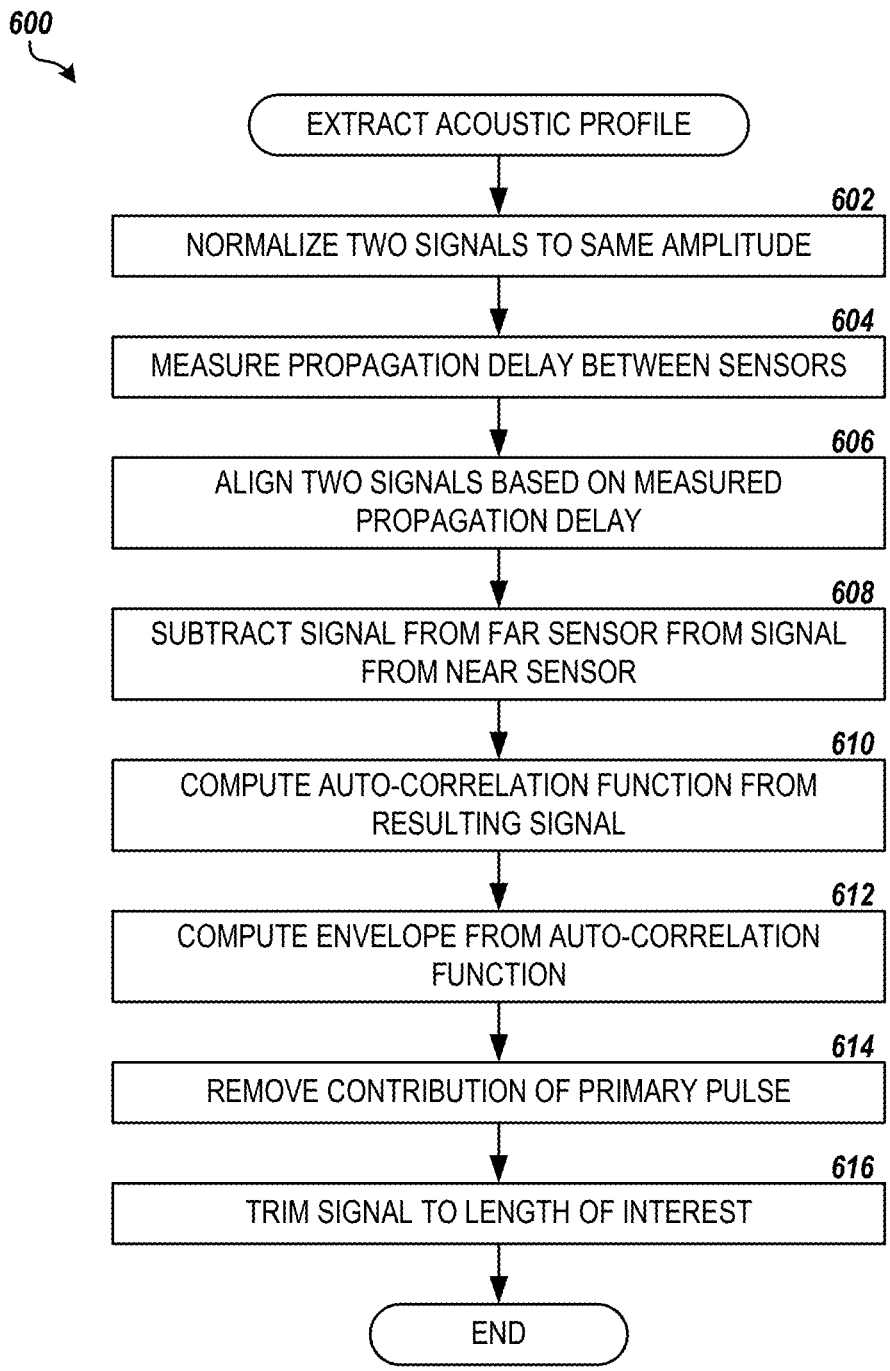
FIG. 6 is a flow diagram showing one routine for extracting an acoustic profile from the recorded signals at the acoustic sensors to be used in pipe condition assessment, according to embodiments presented herein.

FIG. 5 illustrates another routine 500 for performing high-resolution assessment of the condition of pipes down to the individual pipe stick utilizing signal data from additional acoustic sensor(s) 108 and/or recordings from additional excitation locations to reduce the influence of undesirable downstream reflections in the signal data, according to some embodiments. In some embodiments, parts of the routine 500 may be performed by the acoustic analysis module 136 executing on a laptop computer in direct connection with one or more acoustic sensors, such as acoustic sensors 108A and 108B, associated with a target pipe segment 112. In other embodiments, the routine 500 may be performed by some combination of the processor(s) 132, computing devices, components, and modules of the pipe assessment system 130 in conjunction with parameters, data, and/or instructions provided with maintenance personnel associated with the fluid distribution system.

The routine 500 begins at step 502, where two acoustic sensors 108A and 108B are placed at either end of a target pipe segment 112 containing one or more pipe sticks, such as pipe sticks 114C and 114D shown in FIG. 1, for condition assessment. The acoustic sensors 108A and 108B may be placed directly on an exposed section of the pipe and/or any readily accessible appurtenance, such as valves, hydrants, or the like. As described above, the acoustic sensors 108A and 108B may be connected directly to the pipe assessment system 130, either wirelessly or wired, or the acoustic sensors may be indirectly connected to the pipe assessment system through one or more intermediate computing devices or nodes connected to the pipe assessment system via a network.

According to some embodiments, one or more of the acoustic sensors 108A and 108B may already be in place, attached to the pipe 102, valves, or hydrants as part of a leak detection and condition monitoring system for the fluid distribution system. In further embodiments, the fluid distribution system may be a served by a GIS or geospatial mapping system that contains the locations of all pipes, valves, hydrants, meters, etc. in the fluid distribution system. The GIS or geospatial mapping system may allow the selection of the target pipe segment 112 of the pipe 102 to be bracketed by the acoustic sensors 108A and 108B, the appurtenances bracketing the segment of pipe to which to attach the sensors, the target pipe segment 112 and/or pipe sticks 104 for which condition assessment is desired, the associated excitation locations 402A and 402B along the pipe 102, and the like. From these selections, parameters such as type and lengths of the target pipe sticks 104, distances from the acoustic sensors 108A and 108B to the pipe joints 106, precise GPS coordinates of excitation locations 402, and the like can be provided to the pipe assessment system 130 and/or field personnel performing the condition assessment(s), as described herein.

Figure 7:
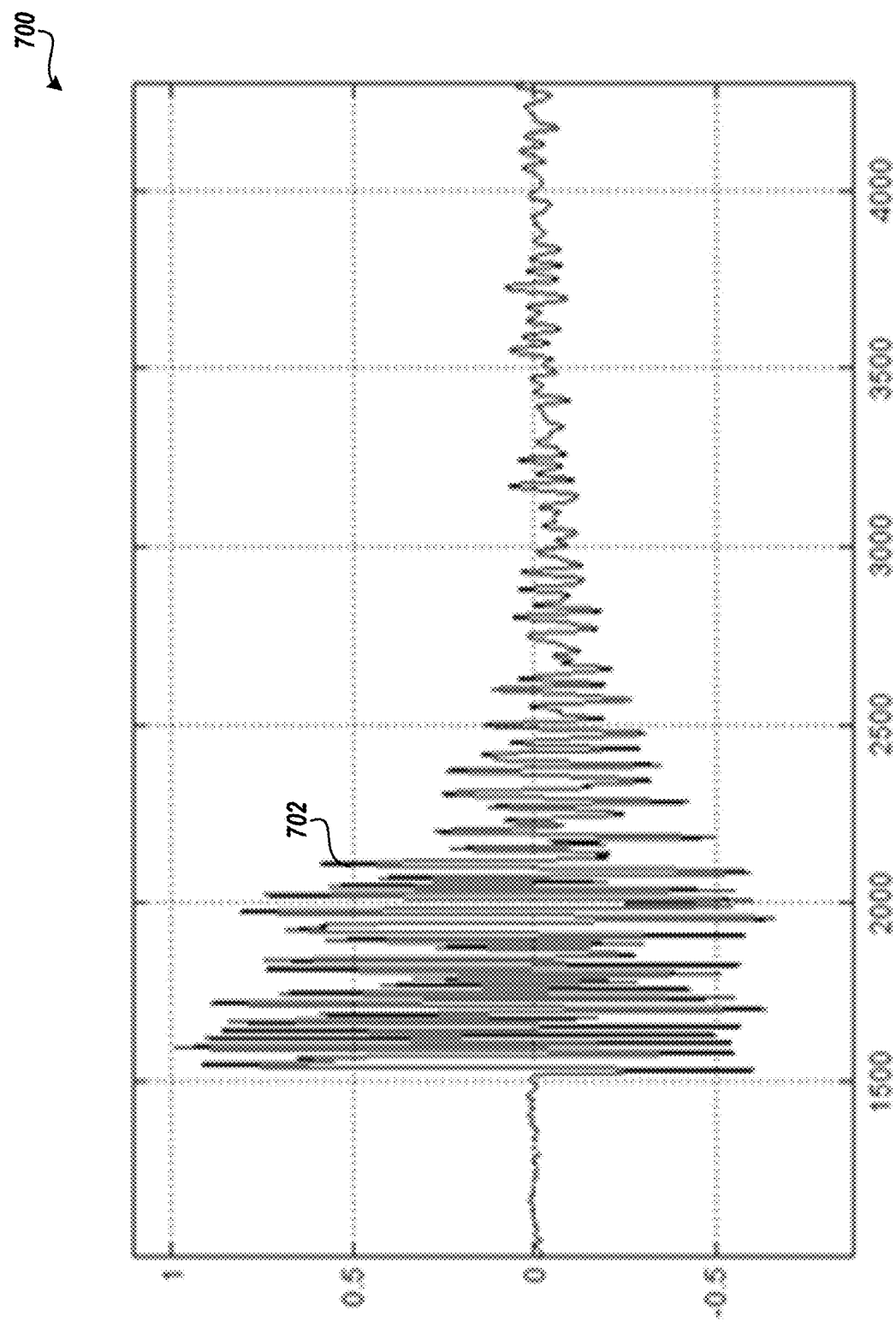
FIG. 7 is a signal graph showing a signal recorded from an acoustic sensor attached to a fluid distribution pipe, according to embodiments presented herein.

Next, the routine 500 proceeds from step 502 to step 504, where the pipe 102 is excited by an excitation source 110 at a first out-of-bracket location while signal data from the two acoustic sensors 108A and 108B is recorded by the pipe assessment system 130. According to embodiments, the location of the first excitation may be located out-of-bracket from the target pipe segment 112 bracketed by the first acoustic sensor 108A (also referred to herein as the "near acoustic sensor") and the second acoustic sensor 108B (also referred to herein as the "far acoustic sensor"), such as location 402A shown in FIG. 4B. In some embodiments, the location of the excitation source 110 is located some distance, e.g., at least 10 meters, from the near acoustic sensor 108A, to avoid the sensor sensing multiple modes of vibration from the excitation. Excitation of the pipe 102 at this first excitation location 402A may be performed by tapping an outer wall of the pipe 102 or appurtenance using a hammer or other impact device, by pounding the ground above the crown of the subterraneous pipe, or by some other excitation means. FIG. 7 shows an example of a signal 702 recorded from one of the acoustic sensors 108A, 108B during such an excitation.

From step 504, the routine 500 proceeds to step 506, where the pipe assessment system 130 extracts an acoustic profile (also referred to as "first acoustic profile" or "acoustic profile—direction 1") from the signal data recorded at the acoustic sensors 108A and 108B utilizing the signal processing techniques described herein. For example, the pipe assessment system 130 may utilize the routine 600 shown in FIG. 6 to extract the acoustic profile from the corresponding signals reflected in the signal data recorded at the first and second acoustic sensors 108A and 108B. At step 602, the pipe assessment system 130 normalizes the two signals to account for amplitude differences in the signals recorded from the near acoustic sensor 108A and the far acoustic sensor 108B from attenuation as the acoustic impulses 114 and reflections 116 travel longitudinally along the length of the pipe.

From step 602, the routine 600 proceeds to step 604, where the pipe assessment system 130 measures a propagation delay between the signal recorded at the first acoustic sensor 108A and the signal recorded at the second acoustic sensor 108B. The propagation delay may be measured utilizing conventional methods known in the art or any of the methods described in the patents incorporated herein by reference. For example, the propagation delay between the two signals may be measured by finding the time delay value corresponding to a peak in the cross-correlation function between the two signals. In further embodiments, the propagation delay between the two signals may be measured utilizing the time-of-flight method, the cross-phase method, or other methods known in the art to find the time delay between two signals.

The routine 600 proceeds from step 604 to step 606, where the pipe assessment system 130 aligns the signal from the second acoustic sensor 108B with the signal from the first acoustic sensor 108A based on the measured propagation delay. The routine 600 then proceeds to step 608, the pipe assessment system 130 subtracts the normalized and aligned signal from the second (far) acoustic sensor 108B from the signal from the first (near) acoustic sensor 108A resulting in a signal with the contribution of any undesirable downstream reflections (i.e., $r_d(t)$) removed, as discussed above in regard to FIG. 4A. It will be appreciated in methods of condition assessment where only one acoustic sensor 108 is utilized with each excitation, such as those described above in regard to FIGS. 1, 2, and 4B, the pipe assessment system 130 may skip steps 602 through 608 of the routine 600 and utilize the recorded signal directly from the single sensor, such as the signal 702 shown in FIG. 7, to determine the acoustic profile.

Figure 8:
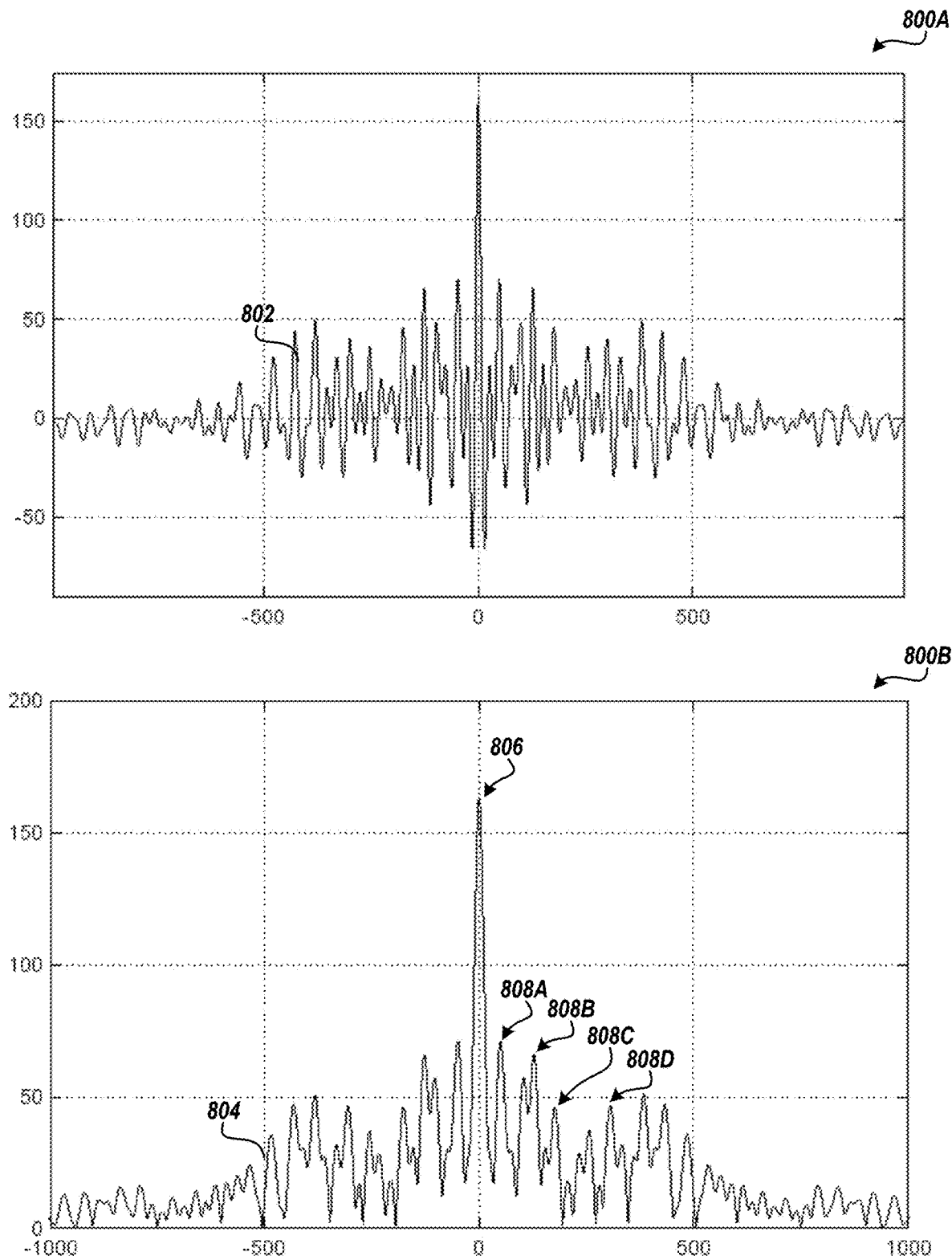
FIG. 8 shows signal graphs of a result of an auto-correlation function of a signal from an acoustic sensor and a signal envelope generated from the auto-correlation function result, according to embodiments presented herein.

At step 610, the pipe assessment system 130 computes the auto-correlation function for the resulting signal from step 608 (or the recorded signal from a single acoustic sensor 108). The signal graph 800A of FIG. 8 shows an exemplary auto-correlation signal 802. According to some embodiments, the pipe assessment system 130 then computes an envelope of the auto-correlation function using, e.g., a Hilbert transform, as shown at step 612, as further shown in the signal graph 800B. From step 612, the routine 600 proceeds to step 614, where the pipe assessment system 130 applies a de-trending filter to remove the contribution of the original acoustical wave (i.e., p(t)), such as the acoustical impulse 114, and emphasize the signal components caused by reflections 116. The influence of the acoustic impulse 114 is shown at the large peak 806 in FIG. 8, while the smaller peaks 808A-808D likely represent reflections of the impulse. For example, a high-pass filter with a cutoff frequency of 25 Hz could be used to remove the main trend in the auto-correlation envelope. The resulting de-trended auto-correlation envelope signal is then used to produce the acoustic profile.

In further embodiments, the routine 600 proceeds from step 614 to step 616, where the pipe assessment system 130 trims the length of the acoustic profile signal (de-trended auto-correlation envelope) down to a time period containing the reflections of interest (i.e., $r_u(t)$) from which the timing information for condition assessment of the pipe sticks 104 within the target pipe segment 112 may be obtained. For example, the acoustic profile may be trimmed to a time window starting at the acoustic impulse 114 and of sufficient length to include all reflections from upstream pipe joints 106 in the target pipe segment 112, i.e. the length of time necessary for the impulse to travel from the near acoustic sensor 108A to the far acoustic sensor 108B and back (dt=2L/c).

From step 616, the routine 600 ends with the extracted acoustic profile signal passed back to step 506 in routine 500. It will be appreciated that other signal processing techniques known in the art in addition to or as an alternative to the steps of routine 600 may be utilized to extract an acoustic profile from the recorded signals that allows accurate timing information to be extracted for performing condition assessment of the pipe sticks 104. It is intended that all such signal processing techniques be included in the scope of this application.

Returning to FIG. 5, the routine 500 continues from step 506 to step 508, where it is determined whether a second excitation in the opposite direction is to be used. As discussed above in regard to FIG. 4B, the generation of the acoustical wave and recording of signal reflections 116 may be performed in two locations 402A and 402B in opposite directions to further reduce the contribution of undesirable downstream reflections (i.e., $r_d(t)$) affecting the extraction of the timing information. If a second excitation is to be used, the routine 500 proceeds to step 510, where the pipe 102 is excited by an excitation source 110 at the second out-of-bracket location 402B while signal data from the two acoustic sensors 108A and 108B is recorded by the pipe assessment system 130. According to embodiments, excitation of the pipe 102 at the second excitation location 402B is performed in substantially the same fashion as excitation at the first location 402A to produce comparable resulting signal(s) from the acoustic sensor(s) 108. It will be noted for the second excitation at location 402B the second acoustic sensor 108B represents the "near" acoustic sensor and the first acoustic sensor 108A represents the "far" acoustic sensor.

From step 510, the routine 500 proceeds to step 512, where the pipe assessment system 130 extracts a second acoustic profile (also referred to as "acoustic profile—direction 2") from the signal data recorded at the acoustic sensors 108A and 108B utilizing the same or similar signal processing techniques of routine 600 described above in regard to FIG. 6. Because the second excitation location 402B is located at the opposite end of the target pipe segment 112 from the first excitation location 402A, the resulting second acoustic profile signal is time reversed at step 514 before combining the two profile signals, as discussed above in regard to FIG. 4B. The second acoustic profile is then shifted to align the signal with the first acoustic profile signal using the propagation delay between the signal recorded at the first acoustic sensor 108A and the signal recorded at the second acoustic sensor 108B from the first excitation at step 604 of routine 600, for example.

The routine 500 proceeds from step 514 to step 516, where the first acoustic profile (related to the excitation at the first excitation location 402A) and the second acoustic profile (related to the excitation at the second excitation location 402B) are combined to enhance the component of the signal contributed by the reflections 116 from the upstream pipe joints 106B-106D of the pipe sticks 104C and 104D in the target pipe segment 112 for condition assessment. As further discussed above in regard to FIG. 4B, the first and second acoustic profiles may be combined by simply adding the first acoustic profile signal with the time-reversed and shifted second acoustic profile signal in order to double the amplitude of the peaks in the signal data representing the reflections of interest. In other embodiments, the first and second acoustic profiles may be combined by calculating the convolution of the two profile signals (without time-reversal or shifting of the second profile signal).

Figure 9:
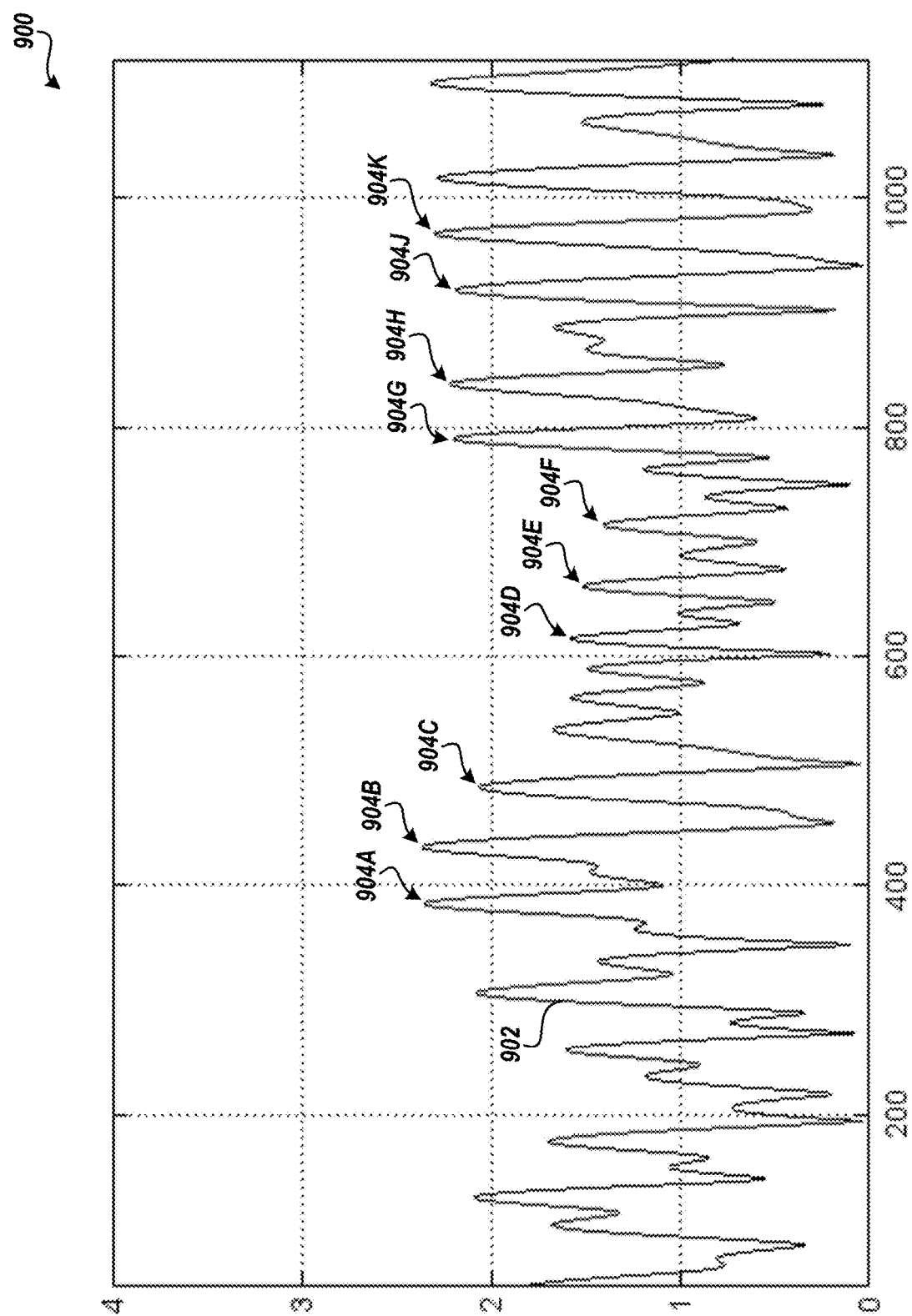
FIG. 9 is a signal graph showing an illustrative acoustic profile extracted from recorded signal(s) by pipe condition assessment system, according to embodiments presented herein.

Next, the routine 500 proceeds from step 516, or if an excitation at a second excitation location 402B is not utilized, from step 508, to step 518, where the pipe assessment system 130 identifies periodic patterns in the peaks of the (combined) acoustic profile signal. The peaks in the profile signal (e.g., de-trended auto-correlation envelope) that follow a predictable periodicity are expected to represent reflections 116 (i.e. $r_n(t)$) from upstream pipe joints in the target pipe segment 112, such as joints 106B-106D shown in FIGS. 1, 3, 4A and 4B. The expected frequency of the period patterns will be based on the length of the pipe sticks 140C, 104D and an estimate of the propagation velocity. FIG. 9 shows an example of a detrended acoustic profile (auto-correlation envelope) signal 904 with peaks 904A-904K that occur in periodic patterns and likely represent the reflections 116 of interest from consecutive joints 106B-106D.

According to some embodiments, the pipe assessment system 130 may apply a bandpass filter to the acoustic profile with a frequency range based on the uniform length l 126C, 126D of the pipe sticks 104C, 104D, e.g.:

$$f_{pattern} \sim \frac{c}{2l}$$

where c is an estimate of the propagation velocity, such as that determined in step 604 of routine 600. The resulting passband signal will contain only peaks of interest representing reflections 116 from joints 106B-106D in the target pipe segment 112. In other embodiments, the pipe assessment system 130 may analyze portions of the acoustic profile signal corresponding in time to different sections of the target pipe segment 112 and extract a dominant frequency (e.g., via a Fourier transform) within the expected frequency range for the pipe in each section. The dominant frequency in each section can then be utilized to isolate the peaks of interest. Alternatively, the pipe assessment system 130 may iteratively apply an algorithm or set of rules to remove one or more peaks from the acoustic profile signal and evaluate the periodicity of the remaining peaks until the predicted patterns (expected frequency) emerges.

From step 518, the routine 500 proceeds to step 520, where the pipe assessment system 130 records the time delay $\Delta t_n$ 124C, 124D between consecutive local maxima (peaks with the periodic patterns) in the acoustic profile. From these time delays 124C, 124D, the acoustical propagation velocity $c_n$ in each pipe stick 104C, 104D within the target pipe segment 112 can be estimated using the formula:

$$c_n = 2\frac{l_n}{\Delta t_n}$$

where $l_n$ represents the length(s), such as lengths 126C and 126D, of pipe stick n. The pipe assessment system 130 may then associate the acoustical propagation velocities $c_n$ computed for each pipe stick 104C, 104D with a condition of that pipe stick, as shown at step 522. For example, the acoustical propagation velocity computed for the pipe stick 104 may be compared with a reference speed of sound for that specific pipe class and material, with any differences used to determine the condition of the section.

From step 522, the routine 500 ends. It will be appreciated that the routines 500 and 600 shown in FIGS. 5 and 6 and described herein may be utilized to perform high-resolution assessment of the condition of pipes 102 down to the individual pipe stick 104 in systems containing one or two acoustic sensors 108 and utilizing one or two excitations, with the applicable steps skipped or repeated as necessary depending on the configuration of the testing system. The various steps may further be performed at different times and in different order than shown, based on the hardware utilized to excite the pipe 102 and record the signal data from the acoustic sensor(s) 108. For example, field personnel may excite the pipe 102 at multiple, various excitation locations 402 associated with multiple target pipe segments 112 while recording signal data from appropriately placed acoustic sensors 108. The signal data associated with the multiple target pipe segments 112 may be stored on the laptop and later transmitted over a network to a server computer in the pipe assessment system 130, where the acoustic analysis module 136 performs condition assessment for one or more pipe sticks 104 contained in each target pipe segment. It is intended that all such variations in the inclusion/exclusion of and order of steps performed of the routines be included in this application.

While the embodiments described above and shown in the figures describe and depict a discrete acoustical impulse 114 propagating through the pipe 102 and reflections 116 therefrom, this is done for clarity of illustration and explanation, and it will be appreciated that the techniques and methodologies described herein are generally applicable to signals reflecting any sound comprising one or more acoustical impulses, vibrations, or pressure waves generated in the fluid path of the pipe by the excitation, including an acoustical wave generated from a continuous broad-band sound source. Further, while the figures and associated description show and describe a target pipe segment 112 containing three pipe joints 106B-106D connecting two pipe sticks 104C and 104D for assessment, this is merely for clarity of explanation, and it will be appreciated that a target pipe segment 112 may contain any number of pipe sticks 104, limited only by an amount of attenuation of the signals within the pipe segment reaching the acoustic sensor(s) 108.

While the description focuses on measuring time delays between consecutive reflections, this analysis could be performed in the frequency domain as well. Further, while the described methods assess condition of individual pipe sticks 104, the use of pulse reflectometry described allows for condition assessment at a resolution larger than one stick. For instance, the target pipe segment 112 may be analyzed for the periodicity of the auto-correlation envelope. A Fourier transform may show a dominant frequency caused by reflections 116 from pipe joints 106 within the target pipe segment 112 that informs on the average speed of sound for that segment.

Based on the foregoing, it will be appreciated that technologies for providing higher resolution assessment of the condition of pipes of a fluid distribution system by in-bracket excitation of the pipes in multiple locations are presented herein. The above-described embodiments are merely possible examples of implementations set forth for a clear understanding of the principles of the present disclosure. Many variations and modifications may be made to the above-described embodiments without departing substantially from the spirit and principles of the present disclosure. All such modifications and variations are intended to be included within the scope of the present disclosure, and all possible claims to individual aspects or combinations and sub-combinations of elements or steps are intended to be supported by the present disclosure.

The logical steps, functions or operations described herein as part of a routine, method or process may be implemented (1) as a sequence of processor-implemented acts, software modules or portions of code running on a controller or computing system and/or (2) as interconnected machine logic circuits or circuit modules within the controller or other computing system. The implementation is a matter of choice dependent on the performance and other requirements of the system. Alternate implementations are included in which steps, operations or functions may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

What is claimed is:

1. A method comprising steps of:
    placing at least one acoustic sensor at one end of a target segment of a pipe, the target segment of pipe comprising a plurality of consecutive pipe sticks connected by pipe joints, the at least one acoustic sensor in acoustical communication with the pipe;
    generating an acoustical wave in the pipe using an excitation source at a first out-of-bracket excitation location while recording signal data at the at least one acoustic sensor, the signal data representing an arrival at the acoustic sensor of the acoustical wave and a plurality of reflections of the acoustical wave from the pipe joints within the target segment of the pipe;
    extracting timing information regarding the arrival of each of the plurality of reflections of the acoustical wave from the pipe joints at the at least one acoustic sensor from the recorded signal data;
    computing a time delay between a first two reflections of the acoustical wave from consecutive pipe joints utilizing the timing information;
    computing an acoustic propagation velocity in the pipe stick between the consecutive pipe joints based on the time delay between the first two reflections of the acoustical wave and a length of the pipe stick; and
    determining a condition of the pipe stick based on the computed acoustic propagation velocity.

2. The method of claim 1, wherein extracting the timing information regarding the arrival of the reflections at the at least one acoustic sensor from the recorded signal data utilizes pulse reflectometry.

3. The method of claim 1, further comprising the steps of:
    computing a second time delay between a second two reflections of the acoustical wave from a second set of consecutive pipe joints utilizing the timing information;
    computing an acoustic propagation velocity in a second pipe stick bracketed by the second set of consecutive pipe joints based on the second time delay between the second two reflections of the acoustical wave and a length of the second pipe stick; and
    determining a condition of the second pipe stick based on the computed acoustic propagation velocity.

4. The method of claim 1, further comprising steps of:
    placing the at least one acoustic sensor at an opposite end of the target segment of a pipe;
    generating an acoustical wave in the pipe at a second out-of-bracket location at the opposite end of the target segment while recording signal data at the at least one acoustic sensor; and
    combining the signal data recorded during the generation of the acoustical wave at the second out-of-bracket location with the signal data recorded during the generation of the acoustical wave at the first out-of-bracket location before extracting the timing information from the combined signal data.

5. The method of claim 4, wherein combining the signal data recorded during the generation of the acoustical wave at the second out-of-bracket location with the signal data recorded during the generation of the acoustical wave at the first out-of-bracket location comprises:
    time reversing the signal data recorded during the generation of the acoustical wave at the second out-of-bracket location;
    shifting the time-reversed signal data recorded during the generation of the acoustical wave at the second out-of-bracket location to align it with the signal data recorded during the generation of the acoustical wave at the first out-of-bracket location; and
    adding the time-reversed and shifted signal data recorded during the generation of the acoustical wave at the second out-of-bracket location to the signal data recorded during the generation of the acoustical wave at the first out-of-bracket location.

6. The method of claim 4, wherein combining the signal data recorded during the generation of the acoustical wave at the second out-of-bracket location with the signal data recorded during the generation of the acoustical wave at the first out-of-bracket location comprises computing the convolution of the two signals represented in the signal data recorded during the generation of the acoustical wave at the first out-of-bracket location and the signal data recorded during the generation of the acoustical wave at the second out-of-bracket location.

7. The method of claim 1, wherein extracting the timing information comprises:
identifying a periodic pattern in the signal data of a representative frequency based on a length of the pipe stick; and
recording times between local maxima in the signal data based on the periodic pattern.

8. The method of claim 7, wherein identifying the periodic pattern comprises applying a pass-band filter to the signal data configured around the representative frequency.

9. A water distribution system comprising:
a pipe comprising a plurality of pipe sticks connected by pipe joints;
a first acoustic sensor and a second acoustic sensor in acoustical communication with the pipe and configured to sense acoustical waves propagating through the pipe and produce signal data representing the sensed acoustical waves and reflections from the pipe joints, the first and second acoustic sensors bracketing a target pipe segment; and
an acoustic analysis module executing on a pipe assessment system communicatively coupled to the first and second acoustic sensors, the acoustic analysis module configured to:
record signal data from the first and second acoustic sensors during generation of an acoustical wave in the pipe at a first out-of-bracket excitation location, combine the signal data recorded from the first and second acoustic sensors to produce a first acoustic profile of the target pipe segment;
extract timing information regarding the arrival of the reflections from pipe joints within the target pipe segment at the first acoustic sensor from the first acoustic profile;
compute a time delay between reflections from consecutive pipe joints utilizing the timing information;
compute an acoustic propagation velocity in a first of the plurality of pipe sticks between the consecutive pipe joints based on the time delay and a length of the pipe sticks; and
determine a condition of the first of the plurality of pipe sticks based on the computed acoustic propagation velocity.

10. The water distribution system of claim 9, wherein combining the signal data from the first and second acoustic sensors to produce the acoustic profile comprises:
normalizing the two signals represented by the signal data recorded from the first and second acoustic sensors respectively;
aligning the two normalized signals based on a propagation delay between the first and second acoustic sensors computed from the signal data; and
subtracting the aligned normalized signal represented by the signal data recorded from the acoustic sensor farthest from the first out-of-bracket excitation location from the aligned and normalized signal represented by the signal data recorded from the acoustic sensor nearest to the first out-of-bracket excitation location.

11. The water distribution system of claim 9, wherein the acoustic analysis module is further configured, prior to extracting the timing information, to:
compute the auto-correlation function for the combined signal data;
compute an envelope for the auto-correlation function; and
apply a de-trending filter to the envelope to produce the first acoustic profile.

12. The water distribution system of claim 9, wherein the acoustic analysis module is further configured to:
record signal data from the first and second acoustic sensors during generation of an acoustical wave in the pipe at a second out-of-bracket excitation location at an opposite end of the target pipe segment from the first out-of-bracket location;
combine the signal data recorded from the first and second acoustic sensors during generation of the acoustical wave in the pipe at the second out-of-bracket excitation location to produce a second acoustic profile; and
combining the second acoustic profile with the first acoustic profile before extracting the timing information from the combined acoustic profiles.

13. The water distribution system of claim 12, wherein combining the first acoustic profile and the second acoustic profile comprises:
time reversing the second acoustic profile:
shifting the time-reversed second acoustic profile to align it with the first acoustic profile; and
adding the time-reversed and shifted second acoustic profile to the first acoustic profile.

14. The water distribution system of claim 12, wherein combining the first acoustic profile and the second acoustic profile comprises computing the convolution of the first acoustic profile and the second acoustic profile.

15. The water distribution system of claim 9, wherein extracting the timing information comprises:
identifying a periodic pattern in the first acoustic profile of a representative frequency based on a length of the pipe sticks; and
recording times between local maxima in the first acoustic profile based on the periodic pattern.

16. A non-transitory computer-readable medium containing processor-executable instructions that, when executed by a processor of a pipe assessment system, cause the processor to:
record signal data from at least one acoustic sensor during generation of an acoustical wave in a pipe of a fluid distribution system at a first out-of-bracket excitation location, the at least one acoustic sensor in acoustical communication with the pipe at one end of a target pipe segment, the signal data representing an arrival of the acoustical wave and reflections from pipe joints within the target segment of the pipe at the acoustic sensor;
extract a first acoustic profile for the target segment from the signal data recorded from the at least one acoustic sensor during generation of the acoustical wave in the pipe at the first out-of-bracket excitation location;
record signal data from the at least one acoustic sensor during generation of an acoustical wave in the pipe at a second out-of-bracket excitation location at an opposite end of the target segment of the pipe, the at least one acoustic sensor placed at the other end of the target segment;
extract a second acoustic profile for the target segment from the signal data recorded from the at least one acoustic sensor during generation of the acoustical wave in the pipe at the second out-of-bracket excitation location;

combined the first acoustic profile and the second acoustic profile;

extract timing information regarding the arrival of the reflections from the pipe joints at the at least one acoustic sensor from the combined acoustic profiles;

compute a time delay between reflections from consecutive pipe joints utilizing the timing information;

compute an acoustic propagation velocity in a pipe stick between the consecutive pipe joints based on the time delay and a length of the pipe stick; and determine a condition of the pipe stick based on the computed acoustic propagation velocity.

17. The non-transitory computer-readable medium of claim 16, wherein extracting the timing information regarding the arrival of the reflections at the at least one acoustic sensor from the combined acoustic profiles utilizes pulse reflectometry.

18. The non-transitory computer-readable medium of claim 16, containing further processor-executable instructions that cause the processor to:

compute a second time delay between reflections from a second set of consecutive pipe joints utilizing the timing information;

compute an acoustic propagation velocity in a second pipe stick bracketed by the second set of consecutive pipe joints based on the second time delay and a length of the second pipe stick; and determine a condition of the second pipe stick based on the computed acoustic propagation velocity.

19. The non-transitory computer-readable medium of claim 16, wherein combining the first acoustic profile and the second acoustic profile comprises:

time reversing the second acoustic profile;

shifting the time-reversed second acoustic profile to align it with the first acoustic profile; and adding the time-reversed and shifted second acoustic profile to the first acoustic profile.

20. The non-transitory computer-readable medium of claim 16, wherein combining the first acoustic profile and the second acoustic profile comprises computing the convolution of the first acoustic profile and the second acoustic profile.

* * * * *